(12) United States Patent
Hall et al.

(10) Patent No.: US 7,721,273 B1
(45) Date of Patent: May 18, 2010

(54) CONTROLLER EQUIPMENT MODEL SYSTEMS AND METHODS

(75) Inventors: Kenwood H. Hall, Hudson, OH (US); Stephen D. Ryan, Waukesha, WI (US); Richard Alan Morse, Hudson, OH (US); Kam-Por Yuen, Anthem, AZ (US); Raymond J. Staron, Richmond Heights, OH (US); Paul R. D'Mura, Glendale, AZ (US); James H. Jarrett, Bay Village, OH (US); Michael D. Kalan, Highland Heights, OH (US); Robert C. Kline, Jr., Phoenix, AZ (US); Charles Martin Rischar, Chardon, OH (US); Christopher E. Stanek, Willoughby, OH (US); Tao Zhao, Gilbert, AZ (US); Kenneth S. Plache, Scottsdale, AZ (US); Shoshana L. Wodzisz, Boston Township, OH (US); Jan Bezdicek, Prelouc (CZ); David A. Johnston, Mentor, OH (US); Jeffery W. Brooks, Mentor-on-the-Lake, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1064 days.

(21) Appl. No.: 10/860,870

(22) Filed: Jun. 4, 2004

Related U.S. Application Data

(60) Provisional application No. 60/520,699, filed on Nov. 17, 2003.

(51) Int. Cl.
*G06F 9/45* (2006.01)
*G05B 19/18* (2006.01)

(52) U.S. Cl. .......................................... 717/149; 700/7

(58) Field of Classification Search ................. 717/135, 717/113, 105, 178, 149; 709/203, 250, 223–224; 700/95–97, 1, 7, 112, 67, 79; 715/744; 714/47; 703/6
See application file for complete search history.

(56) References Cited

U.S. PATENT DOCUMENTS 4,975,865 A 12/1990 Carrette (Continued)

FOREIGN PATENT DOCUMENTS

EP 1414215 A 4/2004

(Continued)

OTHER PUBLICATIONS

European Search Report dated Nov. 23, 2006 for European Patent Application Serial No. 05 025 163.6-1239, 3 Pages.

(Continued)

*Primary Examiner*—Tuan Anh Vu
(74) *Attorney, Agent, or Firm*—Turocy & Watson LLP; William R. Walbrun; John M. Miller

(57) ABSTRACT

The present invention relates to a system and methodology facilitating automated manufacturing processes in an industrial controller environment. An automation system is provided for automated industrial processing. The system includes an equipment phase object that is executed by a controller engine, wherein the equipment phase object can be accessible from internal instructions within the controller and/or from external instructions directed to the controller such as from a server or another controller across a network connection. A sequencing engine operates with the equipment phase object to facilitate automated industrial processing. The sequencing engine can be adapted to various industrial standards or in accordance with other state type models.

50 Claims, 14 Drawing Sheets

U.S. PATENT DOCUMENTS

| | | | |
|---|---|---|---|
| 5,131,092 A | 7/1992 | Sackman et al. | |
| 5,997,167 A | 12/1999 | Crater et al. | |
| 6,105,072 A | 8/2000 | Fischer | |
| 6,138,049 A | 10/2000 | McLaughlin et al. | |
| 6,289,252 B1 * | 9/2001 | Wilson et al. | 700/7 |
| 6,321,272 B1 | 11/2001 | Swales | |
| 6,414,594 B1 | 7/2002 | Guerlain | |
| 6,505,247 B1 | 1/2003 | Steger et al. | |
| 6,782,351 B2 | 8/2004 | Reichel | |
| 6,788,980 B1 * | 9/2004 | Johnson | 700/1 |
| 6,947,917 B1 * | 9/2005 | Mathur et al. | 706/45 |
| 6,999,992 B1 | 2/2006 | Deen et al. | |
| 7,065,714 B1 * | 6/2006 | Theel et al. | 715/781 |
| 7,096,465 B1 * | 8/2006 | Dardinski et al. | 717/178 |
| 7,242,991 B2 * | 7/2007 | Budinger et al. | 700/95 |
| 7,290,030 B2 | 10/2007 | Edwards | |
| 2002/0012321 A1 | 1/2002 | Rune et al. | |
| 2002/0012323 A1 | 1/2002 | Petite | |
| 2002/0029266 A1 | 3/2002 | Tse et al. | |
| 2003/0009711 A1 | 1/2003 | Kuhn et al. | |
| 2003/0050986 A1 | 3/2003 | Matthews | |
| 2003/0115122 A1 | 6/2003 | Slater | |
| 2003/0196122 A1 | 10/2003 | Wesinger | |
| 2004/0153552 A1 | 8/2004 | Trossen et al. | |
| 2005/0073402 A1 | 4/2005 | Denyer | |
| 2005/0187987 A1 | 8/2005 | Lim | |
| 2005/0237183 A1 | 10/2005 | Lamb | |

FOREIGN PATENT DOCUMENTS

| | | |
|---|---|---|
| WO | 0199078 A | 12/2001 |
| WO | 03103264 A | 12/2003 |

OTHER PUBLICATIONS

Eric Byres, Shoot-out at the Ethernet collal. Instrument Society of America. http://findarticles.com/p/articles/mi_qa3739/is_200102/ai_n8951097/print. Feb. 2001.

OA Dated Jul. 28, 2008 for U.S. Appl. No. 10/990,432, 24 pages.

OA mailed May 29, 2009 for U.S. Appl. No. 10/990,432, 22 pages.

OA mailed Feb. 4, 2009 for U.S. Appl. No. 10/990,432, 19 pages.

Final OA mailed Dec. 21, 2009 for U.S. Appl. No. 10/990,432, 34 pages.

* cited by examiner

CONTROLLER EQUIPMENT MODEL SYSTEMS AND METHODS

RELATED APPLICATION

This application claims priority to U.S. Provisional Patent Application Ser. No. 60/520,699 which was filed Nov. 17, 2003, entitled LOGIX EQUIPMENT MODEL SYSTEMS AND METHODS, the entirety of which is herein incorporated by reference.

TECHNICAL FIELD

The present invention relates generally to industrial control systems, and more particularly to a system and methodology that provides an enhanced equipment model, processing environment, and interface in an automated industrial controller environment.

BACKGROUND OF THE INVENTION

Industrial controllers are special-purpose computers utilized for controlling industrial processes, manufacturing equipment, and other factory automation, such as data collection or networked systems. Controllers often work in concert with other computer systems to form an environment whereby a majority of modern and automated manufacturing operations occur. These operations involve front-end processing of materials such as steel production to more intricate manufacturing processes such as automobile production that involves assembly of previously processed materials. Often such as in the case of automobiles, complex assemblies can be manufactured with high technology robotics assisting the industrial control process.

In many automated processes, including the basic production of commodities such as food, beverages, and pharmaceuticals, complex state logic is often designed and programmed by systems Engineers or provided in some cases by automated equipment manufacturers. This logic is often programmed with common PLC ladder logic or higher level languages supported by Sequential Function Charts. Sequence logic can be employed for a plurality of tasks such as material movement and conveying operations, packaging operations, or as part of an assembly process itself, wherein various stages of an assembly are sequenced from stage to stage until a final assembly occurs. As can be appreciated, much planning and design is required to implement an automated production process that can involve hundreds of machines, computers, and program logic to facilitate proper operation of the respective sequences.

One problem in implementing a state-driven system is that there are sometimes thousands of rungs of logic that have to be designed and debugged before an automated manufacturing process can be validated. Some control manufacturers have attempted to mitigate this problem by providing portions of these programs to Engineers who then implement or modify such programs for a particular industrial control process. This type of approach while aiding in code development time still has several drawbacks. In one case, code that is provided and subsequently entered and/or modified is subject to human error during implementation of the control process. This code also is routinely debugged each time a new industrial process is set up. Moreover, highly regulated industries such as pharmaceuticals require code to be validated. Thus, during an installation phase of the respective code or logic, code that has been debugged during previous automation endeavors has to be re-validated. As can be appreciated, costs from errors, debugging, and validation are multiplied each time a new manufacturing process is set up or installed.

Another problem with conventional control systems relates to how state operations are managed between controllers and other components such as batch processors that interact with the controllers. Presently, rigid style control architectures exist where duplicate state machines run substantially in parallel on the controller and the batch processor. While this may serve some limited control needs, this type architecture limits the type of control that can be deployed in modern industrial processes. For instance, adding additional control members such as other controllers to an existing process would require the design of an additional state machine in the controller and the batch processor that would have to be somehow integrated with the existing duplicate machinery already in place which is tedious and costly at best and may not be practical at worst. Also, current systems tend to be coded without substantial regard for the need for human and/or machine interaction with the respective state machines and processes which makes it exceedingly difficult to design, maintain, and/or modify existing systems for other processing needs.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate a state-driven programming and equipment model for an industrial automation environment. In one aspect, an equipment model object is provided that encapsulates code into functional modules that can be executed internally on a controller via a sequencing engine rather than as disparate elements of logic. In this manner, code-debugging requirements for sequential processes are mitigated. Also, since many functional elements of the model are encapsulated and executed as part of the controller's processing environment (e.g., not as part of logic program), validation costs for such functionality is also mitigated. In addition to internal sequencing or processing, the equipment model object also supports enabling external processes to access the object to facilitate broader system control options. For example, a batch server can send process commands that affect operations of the object and resulting sequencing operations. These commands can be executed in accordance with multi-level state machines that operate at various levels of a process which enables batch execution to be distributed over multiple controllers and components in an efficient and robust manner.

In one aspect, the model includes support for an ISA S88 process environment including modifications that enhance conventional S88 models. These modifications include additions such as pre-state processing, fault condition processing, and providing for a resetting state that allows code to be written and executed before a selected state is entered, for example, in order to facilitate proper operations of a process. Also, if desired, additional "sub" states can be executed from basic model states to facilitate such aspects as setting program breakpoints that further aid program development. The model also can be driven and/or influenced such as from notifications, events, or alarms that can be communicated from internal sources or external network sources such as an external sequencer operating outside or remote from the controller currently executing the model.

In other aspects of the present invention, the model described above supports execution of separate and/or different state routines based on a detected phase state of the model, whereby definition of any given state routine is optional. An equipment phase can also be provided having an associated program object that allows the object to be scheduled similar to a logic program, and yet enables the object to run state machines as well as program subroutines. Other aspects include employment of instructions for interacting with the model and graphical user interfaces to monitor and adjust phase parameters of the model. These interfaces include such aspects as phase toolbars, phase monitors, and structured tasks to facilitate monitoring and control of desired processes associated with the model. Also, internal sequencing and synchronization routines are provided that are executed by the controller and thus, enable variables or parameters entered by one system to be automatically updated in accordance with requirements of another system. The model of the present invention can also support hybrid control architectures that support sequence logic as well as external sequencing processes such as Batch control.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology facilitating automated manufacturing processes in an industrial controller environment. In one aspect, an automation system is provided for automated industrial processing. The system includes an equipment phase object that is executed by a Programmable Logic Controller engine, wherein the equipment phase object can be accessible from internal instructions within the controller and/or from external instructions directed to the controller such as from a server or another controller across a network connection. A plurality of state machines operating on a batch server for example, can be associated with the external instructions, wherein the state machines operate at multiple levels of a batch process to facilitate automated industrial processing. Also, a sequencing engine operates with the equipment phase object to facilitate automated industrial processing. The sequencing engine can be adapted to S88 industrial standards or in accordance with other state type models, if desired.

It is noted that as used in this application, terms such as "component," "model," "object," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers (e.g., via data packets and signals between the computers), industrial controllers, and/or modules communicating therewith.

Figure 1:
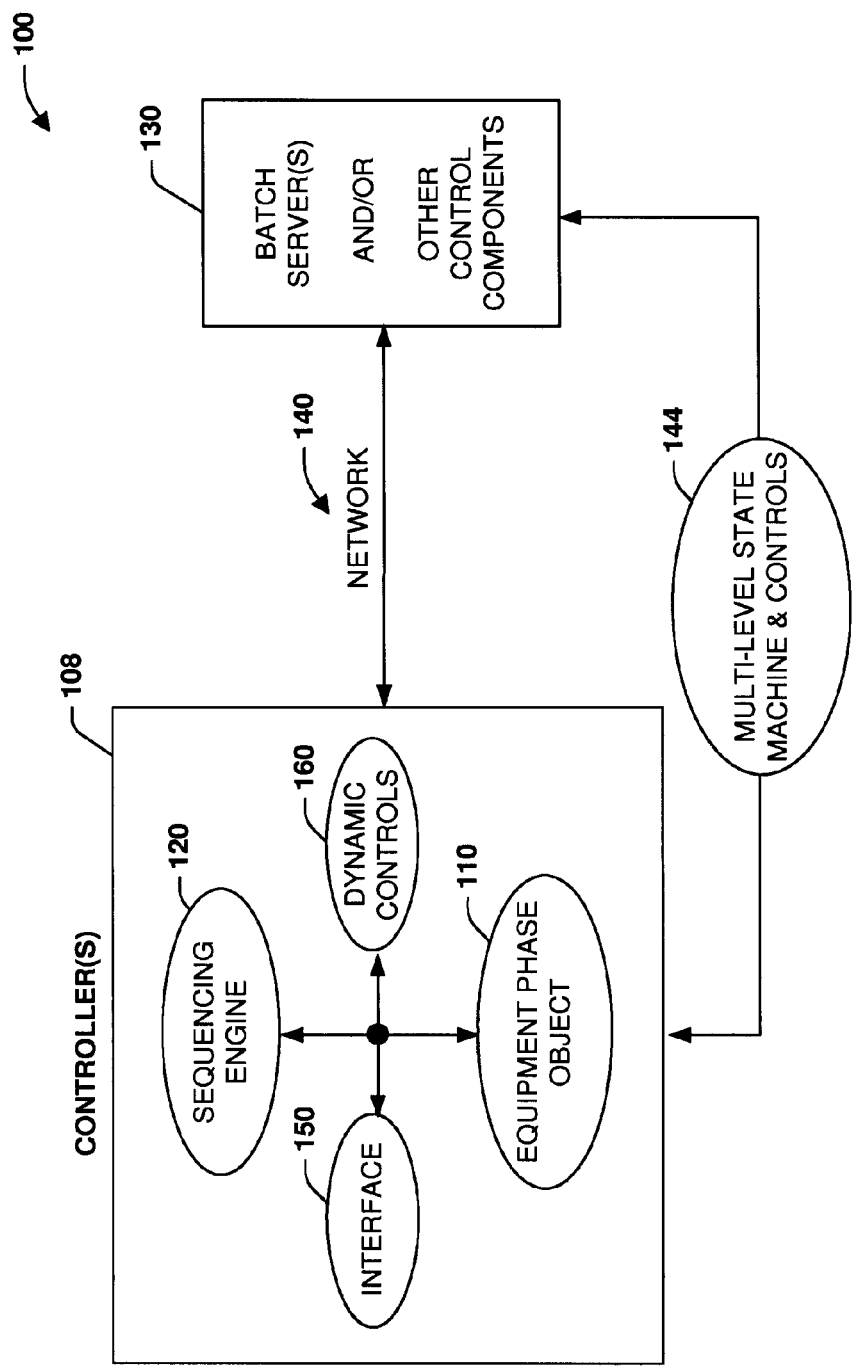
FIG. 1 is a schematic block diagram illustrates an equipment model and processing system in accordance with an aspect of the present invention.

Referring initially to FIG. 1, a system 100 illustrates an equipment model and processing system in accordance with an aspect of the present invention. The system 100 includes a controller 108 (or controllers) having an equipment phase object 110 that operates in conjunction with a sequencing engine 120 (or state machine) to facilitate automated industrial control operations. The object 110 and engine 120 support internal and/or external control operations and are provided as part of underlying execution functionality of the controller 108. For example, the sequencing engine 120 can execute internal state operations using parameters that are defined within the equipment phase object. Alternatively, one or more batch servers and/or other control components 130 coupled via a network connection 140 can access the equipment phase object 110 to affect operations within the controller 108. Such control components 130 can include controllers, computers, batch servers or processors, other modules, and so forth. Since the equipment phase object 110 provides internal and/or external control mechanisms, control system architectures can include hybrid type architectures that are combinations of the controller 108 and one or more of the other control components 130.

In one aspect of the present invention, various state machines or controls can exist on or in accordance with the batch server 130 which is illustrated at reference numeral 144, whereby a state machine can be provided for each step (or a subset of steps) within a recipe. For example, a state machine can be provided for each instance of an equipment module, the operation recipe step the module belongs to, the unit procedure recipe step the operation belongs to, the procedure (e.g., the recipe) the unit procedure step belongs to, and so forth which can all interact with the equipment phase object 110. Thus, multi-level state machines 144 can be provided that control/interact objects within the controller 108 and/or objects outside the controller. Thus, by not rigidly tying a single state machine in the controller 108 with a single state machine in the batch server 130, batch execution can be distributed over multiple controllers and/or other components in an efficient and scalable manner.

It is noted that an upper level component can "download" the logic to be used by lower level recipe elements. For example, if the "upper level" is a Unit Operation running inside of a batch server, it could download the "ING" or Active routines to be used by the equipment phase for this recipe execution. If the "upper level" were a batch procedure, it could download the recipe structure for the Unit Procedure and Unit Operations to be run inside of the Unit.

The equipment phase object 110 generally exists in the controller 108 and maintains pertinent information related to configuration, state, and execution of an associated process. From a high-level, the equipment phase object is generally responsible for such aspects as:

Enforcing the state machine and providing services to command a Phase.

Managing state routines and scanning a routine based on an active state.

Providing services for sequencing engines to manage tags for parameter and report values.

Exposing state data for internal (within the controller) and external clients.

Providing configuration options and services for handling failures, holds, and restarts.

Providing services to report and clear Phase failures.

Providing services to request ownership of the Phase and enforcing rules of ownership.

The controller 108 can also include other aspects such as an interface 150 that enable users to easily configure and monitor the object 110 or other components within the controller. This can also include such aspects as providing one or more instructions to facilitate internal and/or external control operations. Additionally, one or more dynamic controls 160 can be provided to facilitate operations within the system 100. Such controls can include phase controls, routine controls, external/internal sequencing controls, and such aspects as handling of internal or external notifications and events, for example. Such interfaces 150 and controls 160 are described in more detail below.

Figure 2:
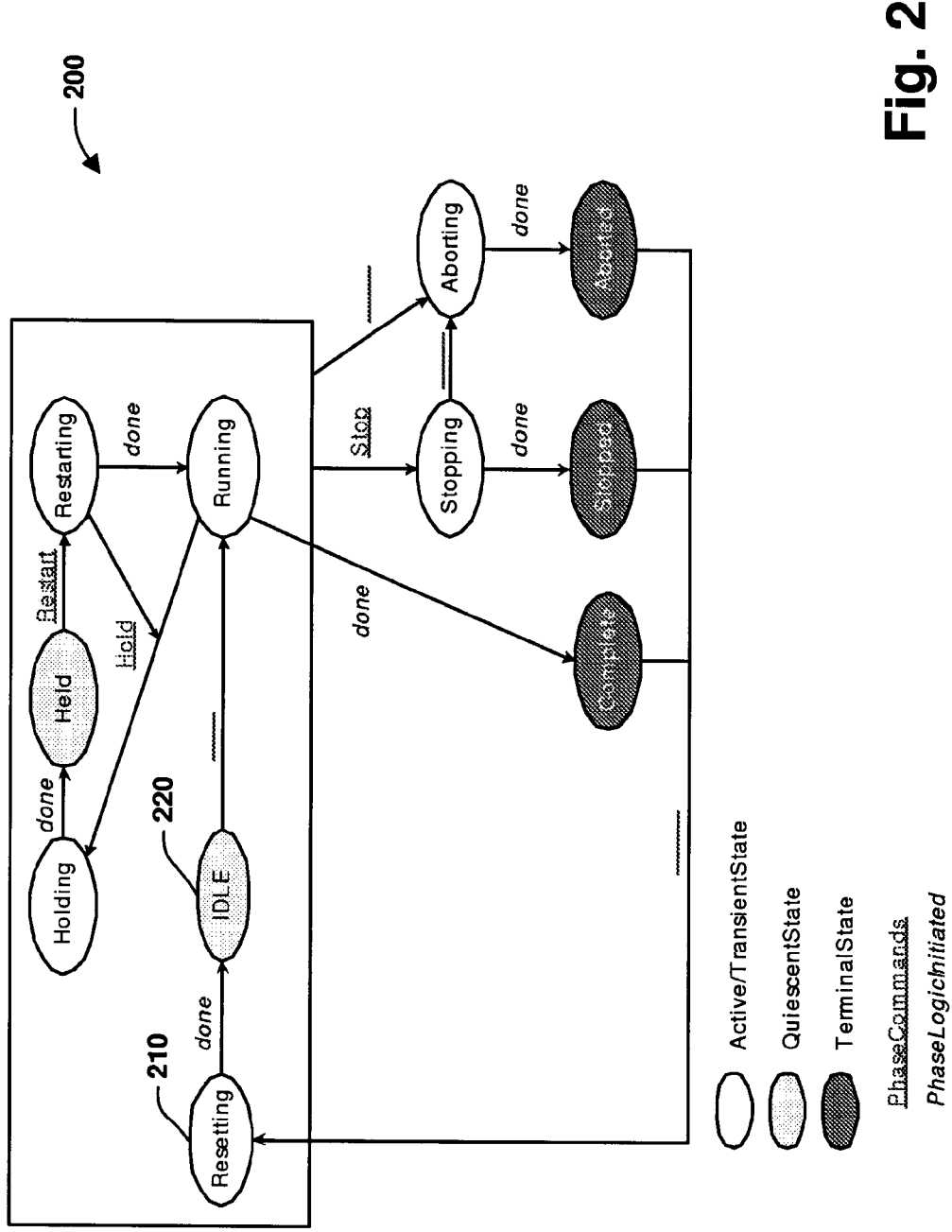
FIG. 2 is a state diagram illustrating an equipment phase state machine in accordance with an aspect of the present invention.

Referring now to FIG. 2, an equipment phase state machine 200 is illustrated in accordance with an aspect of the present invention. As noted above, the equipment model described above includes the execution of a state-driven sequencing engine internally in one or more families of controllers. The state machine 200 is typically a modified S88 state model with additions such as a Resetting state 210 to allow code to be written and executed before an IDLE state 220, for example. The state machine 200 cooperates with an equipment phase object that encapsulates associated control data and related behavior of the phase (e.g., state machine, data type, tag updates). It is noted that the state machine can be embedded within the object and/or exist as a complete or partial functional entity from the object. As illustrated in the state machine 200, various states are supported such as holding, held, restarting, running, stopping, aborting, complete, stopped, aborted, and so forth. Also, various phase commands are provided for transitioning between states such as start, restart, stop, and abort, for example.

The above model provides several advantages to a user such as:

A user doesn't have to write and debug state machine code since it's encapsulated into an object.

This also mitigates validation costs for user's—the state machine, it's ability to trigger the correct phase logic ("ING" routines or "Active States"), and it's updating of the phase data (the tag) generally are only validated once.

The equipment phase state machine 200 facilitates that phase logic exhibits the behavior characteristics to be controllable by a sequencing engine. This machine is typically an integral part of the equipment phase object, however, other implementations are possible. The equipment phase object generally determines state transitions, the validity of phase commands, and/or other aspects related to the state machine 200. The object is also responsible for managing concurrent access from multiple clients that may try to affect the state of the object. For example, if a phase command from an internal sequencing engine (in a user task) occurs at a similar time as the phase logic sets the state to done (in the phase task), the equipment phase object should predictably and reliably manage these concurrencies.

The Resetting state 210 can be added to the equipment phase's state machine 200 for at least the following reasons:

Adding this state provides support for a PackML state machine (Package Machinery Language Team of the Open Modular Architecture Controller (OMAC) group)

The S88 state machine is somewhat inconsistent in that phase logic code can be written to respond to most commands except for Reset. A user may require some phase logic to properly return the object to an Idle state. If the phase's Running state is implemented as an Sequential Function Chart (SFC), upon completion the SFC resides at the terminal step. In order to direct the SFC back to the initial step, either some logic resets the SFC (using an SFR instruction), the user codes the SFC with a "loopback" from the end back to the initial step, or the Equipment Phase itself has to "fix-up" the SFC. The last option is generally not desirable—the phase cannot generally account for all the potential permutations and combinations of the user's logic. The state machine 200 of an equipment phase can be configured utilizing the following attributes:

| Configuration Item | Description |
| --- | --- |
| Initial State | The state to which the system should initialize the Phase (e.g., on power-up or pre-scan). The following states are valid for this item:<br>Idle [default]<br>Stopped<br>Aborted<br>Complete |
| Active State Routine not Implemented | The action to take when the Phase transitions to a state where the State Routine is not implemented. Immediately (or as soon as possible) set<br>State Complete [default]<br>Set a Phase Failure<br>Demo Mode - set State Complete after 10 seconds<br>No Action |

Figure 3:
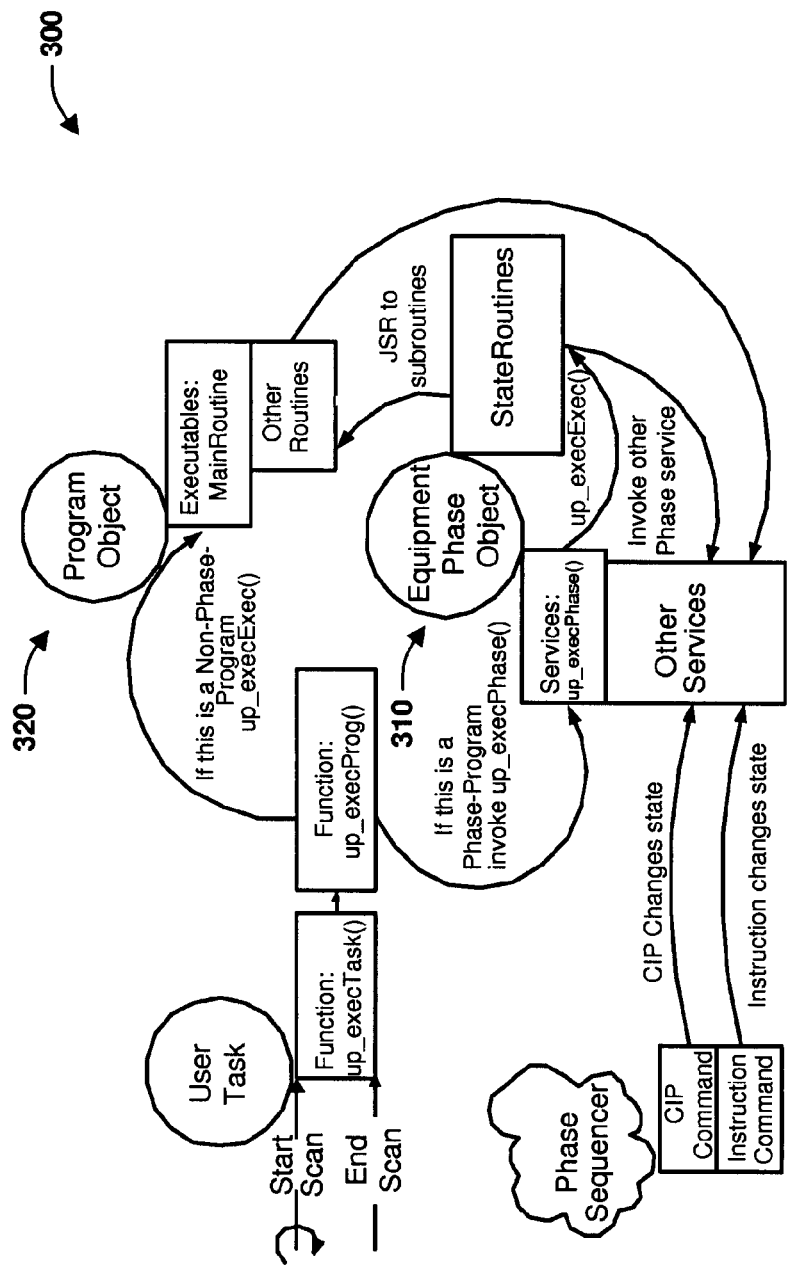
FIG. 3 is a state diagram illustrating an execution model in accordance with an aspect of the present invention.

FIG. 3 is a system 300 illustrating an execution model in accordance with an aspect of the present invention. Within the execution model 300, an Equipment Phase execution 310 follows a current Program execution model at 320. The Equipment Phase enforces the S88 state machine (or other standard than S88) and executes S88 state transition logic. The Program serves as the execution vehicle, and the Equipment Phase binds to a program in order to be executed. As long as the Equipment Phase is bound to a Program, then at runtime the program executes the Equipment Phase's execution logic. This implies that respective Phase instances have an entry point to serve as the binding interface to a Program (e.g., similar to a Windows environment, as the DLLMain of a DLL that is invoked at runtime by the main thread of an execution program). This entry point interface invokes the Equipment Phase's state transition logic routine based on the Equipment Phase's current state status.

Generally, an Equipment Phase is associated with a Program, in a firmware execution engine, whereby a Program is usually considered as a "Non-Phase-Program" if there is no Equipment Phase associated with it, or a "Phase-Program" if there is an Equipment Phase associated with it. For a Phase-Program, generally no Main Routine exists; the execution engine calls the associated Equipment Phase via the Equipment Phase's entry point service. In order to achieve this behavior, the following modifications to a controller's logic engine may be provided:

A Task-Program execution model can be unmodified.
    A new function, up_execPhase( ) is created to execute the Equipment Phase. This is a private service of Equipment Phase that serves as the Equipment Phase's entry point interface. This service executes the Equipment Phase's state routines accordingly.
    The execution engine, that is the up_execProg( ) function, is modified to determine whether a Program is a Non-Phase-Program or a Phase-Program. If the Program is a Non-Phase-Program, then the engine executes the Program's
    Main Routine; if the Program is a Phase-Program, the engine executes the Equipment Phase by invoking up_execPhase( )

Equipment Phase instances typically have an entry point interface that the execution engine calls at runtime to execute the phase. This service executes a Pre-state routine and the implemented state routines during pre-scan. For regular execution (after pre-scan), this service executes the Pre-state routine and the current active state routine. This service also updates the internal executing-state value at the beginning of each scan of the active state routine, in order that this value can be utilized by an instruction to complete the active state routine. The execution engine is generally updated to distinguish a Non-Phase-Program from a Phase-Program and execute it accordingly. The execution engine binds the Equipment Phase and the Program at runtime for execution if the Program has an Equipment Phase associated with. The changes to the function up_execProg( ) may appear as:

If (the program is a Non-Phase-Program) {
      // Normal execution
        Execute the Program's Main Routine: invoke up_execExec( )
    } Else {
      // Program is a Phase-Program new execution path
      Execute the Equipment Phase: invoke up_execPhase( )
    }

At runtime, the execution vehicle: Program, which is scheduled in a user task, is scanned to execute repeatedly. During a scan (or before/after), the execution engine invokes the Equipment Phase's entry point interface service: up_execPhase( ). This service executes the Prestate/state routines based on the current state of the Equipment Phase, and the internal execState variable is updated accordingly. Also, an Equipment Phase sequencer can issue commands (via CIP messages, Instructions, etc.) to attempt to change the state of the phase. The Equipment Phase object generally executes decisions on the state transition. On the next scan, a new state change is captured and the corresponding state routine is executed. The execution of an Equipment Phase is configurable using the following attributes:

| Configuration Item | Description |
| --- | --- |
| Prestate Routine | A routine to scan prior to executing any of the Phase's State Routines. This routine may perform and indicate some failure detection, verify that control modules are in the correct state, or execute other logic that is common to various state routines. None<br>Select from the Phase program's subroutines |

From a controller, other programs and routines can be defined that use specialized instructions to command phases (from within the controller) in simple operations (recipes)—referred to as Internal Sequencing. The phases can also be commanded by an external application that establishes a connection to the controller (such as a Batch Server)—referred to as External Sequencing. In addition, an operator, via an HMI, or control engineer, can manually sequence an Equipment Phase.

The applications described above generally fall into two types Sequencing applications and Manual applications. As the name suggests, Sequencing applications manipulate Equipment Phase objects as a part of sequence (typically a higher-level recipe that includes the phase). These applications are programs; they programmatically interact with the phase based on a given set of data such as a recipe, for example. Typically, the applications determine if a phase is available for use (e.g., a Batch Server arbitrates for the use of a phase) before sequencing begins. Manual applications provide human operators the ability to manually control an Equipment Phase. Operators use these applications to command a phase during commissioning and/or troubleshooting scenarios, typically when there is a problem with a sequencing application that is using the same phase. The operator typically desires to take control of the Equipment Phase during manual operations even if another application owns it. Moreover, when taking control, the Equipment Phase should no longer accept commands from the sequencing application—only the operator should control it. In effect, the operator is overriding the sequencer.

Due to the possibility of multiple sequencing applications, another item can be introduced to the Equipment Phase associated with attaching to the phase before utilizing it. In essence, the sequencing application queries the phase: "Is the phase being used now?" If the phase is available, it reserves itself for the sequencer. If not, it returns a busy error to the caller (which can happen if another sequencing engine is executing). When the sequencing application attaches to the phase, the Equipment Phase accepts commands from that sequencer. When the sequencing application is finished commanding the phase, it detaches from it, thus allowing other sequencers the opportunity to attach to the phase. In a similar manner, manual applications make a request to the Equipment Phase to override a sequencing application that is already attached to it. When it is overridden, the Equipment Phase notifies the sequencer that its ownership has changed.

Now that the phase is overridden, the overriding application is able to command the phase. Again, similar to a sequencer, the manual application detaches from the Equipment Phase after it finishes commanding the phase.

Figure 4:
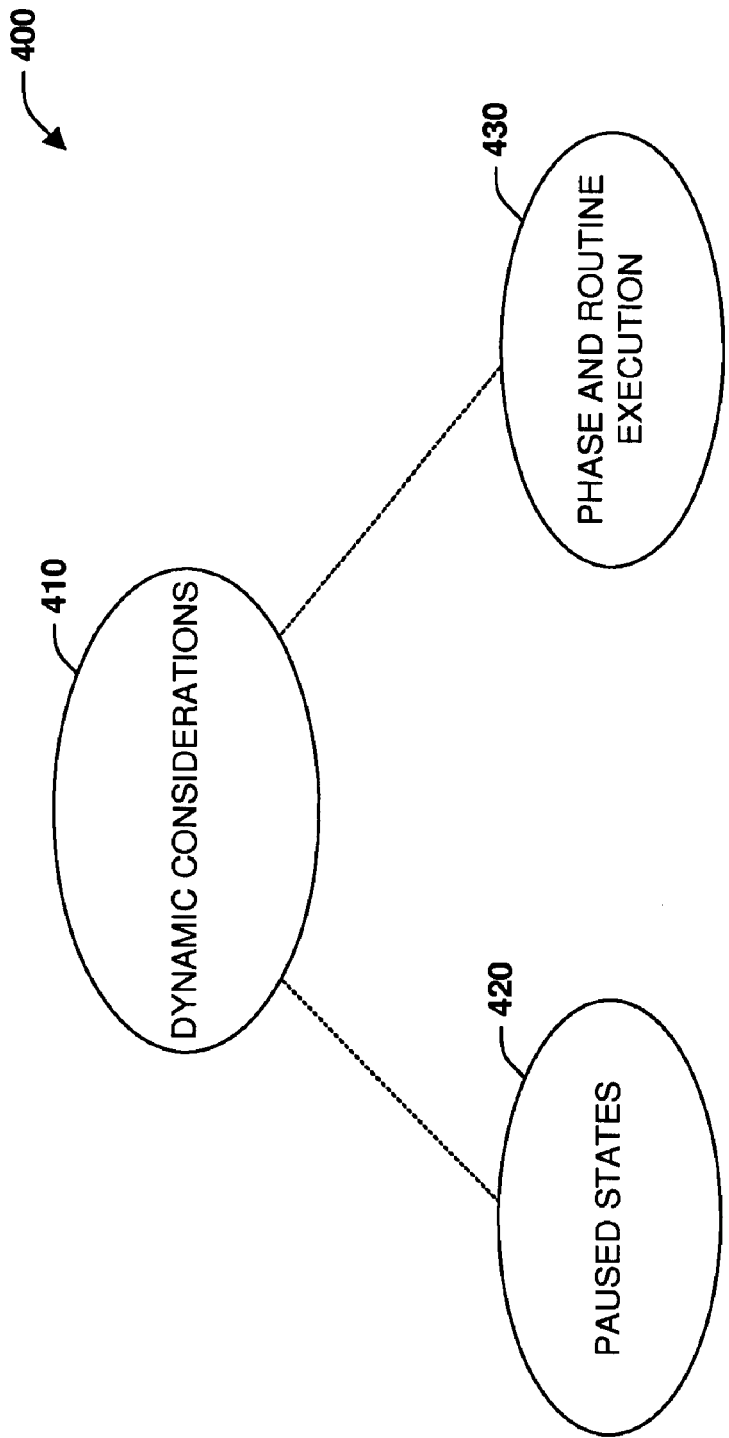
FIG. 4 illustrates dynamic processing considerations in accordance with an aspect of the present invention.

Referring now to FIG. 4, a diagram 400 illustrates dynamic processing considerations 410 in accordance with an aspect of the present invention. Additional "sub" states beyond those shown in FIG. 2 above can also be added. These states can be made available from any "Active" state (e.g., resetting, holding). At 420, phase logic developers employ an Equipment Phase Paused instruction (PPD) to set a breakpoint in one of the phase's state routines. Breakpoints can be utilized when an operator or sequencer sends a Pause command to the Equipment Phase. A Pause command changes the phase sub-state to Pausing, and then the phase logic programmer employs the PPD instruction to set a breakpoint, which changes the sub-state to Paused. The state routine should not be actively sequencing or stepping when it is paused. Then the operator or sequencer issues a Resume command to continue operation from the breakpoint. The following depicts an example logic representation of the PPD instruction.

| Feature | Description |
| --- | --- |
| Representation | -[PPD]- |

At 430, the Equipment Model provides the ability to execute separate and different state routines based on a phase state model described above. An equipment phase also has an associated program object that allows it to be scheduled similar to how a program is scheduled, and allows it to run state routines as well as normal subroutines. Some of the advantages of these features and others are:

State routines can be easily implemented in any language supported by the controller.

Individual state routines allow for easy modularity of code. Conventionally, states are managed in one RLL routine (with fault detection—prestate—logic beforehand).

A configuration option is added to allow state routines to be unimplemented but act as if the state completes immediately. Conventionally, a user writes logic for each state, else the state will not complete.

A configuration option is added to allow the initial state to be configured.

Equipment phases can be scheduled to run in any desired task of any desired type.

Generally, only state routines defined in the state machine above (for "Active" states) can be defined and implemented, wherein names are fixed. This can reduce errors and debugging time as well as allow systems to be more familiar to users.

Figure 5:
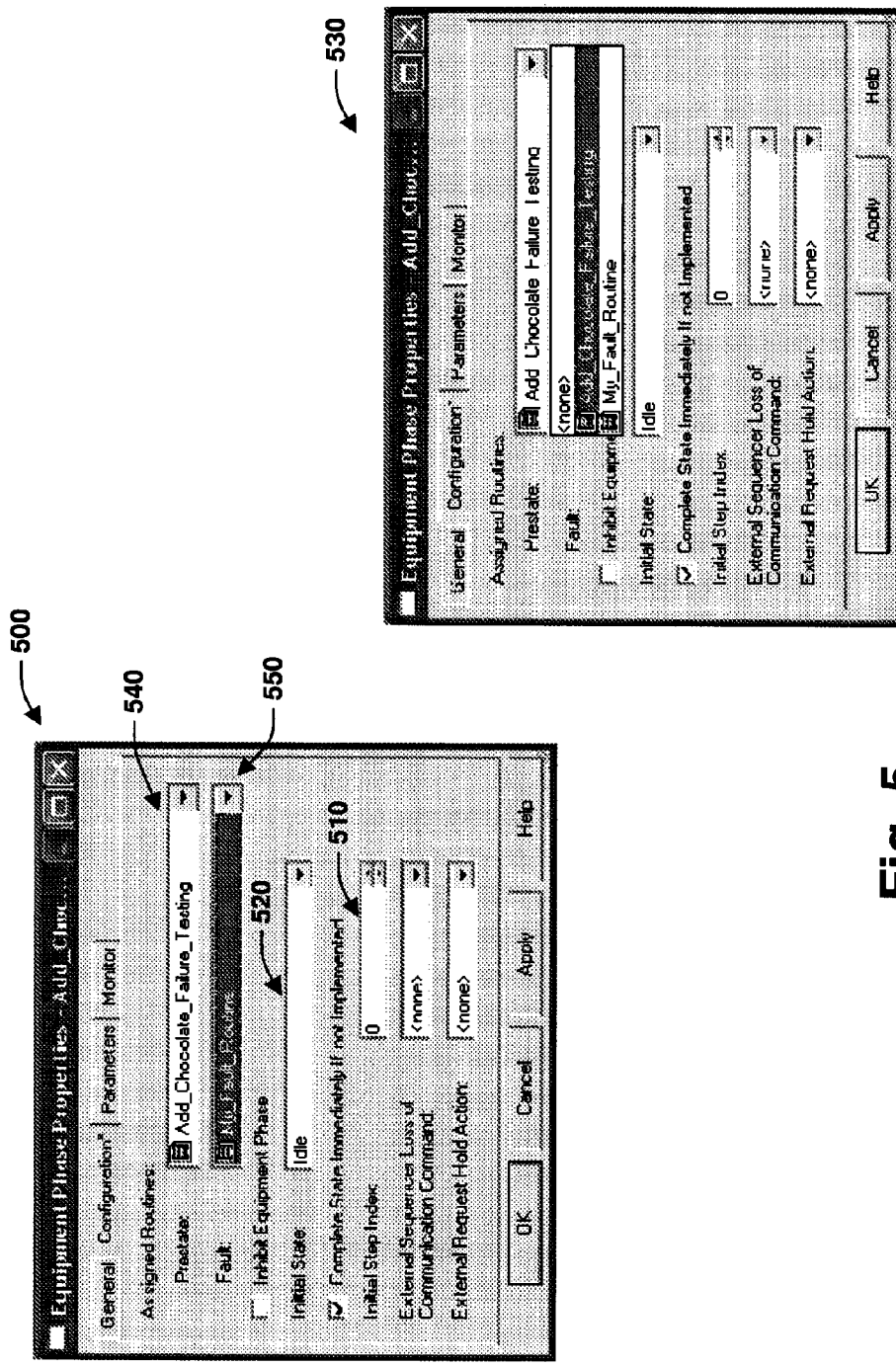
FIG. 5 illustrates exemplary user configuration interfaces in accordance with an aspect of the present invention.

Turning to FIG. 5, exemplary user configuration interfaces are illustrated in accordance with an aspect of the present invention. An interface 500 illustrates example configuration options that can be selected and shows a configuration option on an equipment phase indicating to complete a state immediately if it is not implemented as well as an initial state at 520 (e.g., Idle). An interface at 530 illustrates the concept of selecting a "prestate" routine 540 or fault routine 550 in an equipment phase. The prestate routine is generally executed once during the controllers pre-scan, and is then executed with each phase state routine. The purpose of this extra routine is to allow the user to write code to check and indicate/signal for failure conditions (or ensure that equipment is in the correct position/state) before executing the state logic. Prior to the Equipment Model described above, a user typically wrote this logic at the beginning of each state routine and many times the code was identical. This allows it to be encapsulated in once place and automatically executed without additional work by the user.

It is noted that the graphical interfaces described herein are exemplary in nature and it is to be appreciated that various other implementations are possible. For instance, such interfaces can include a display output having one or more display objects that can include such aspects as configurable icons, buttons, sliders, input boxes, selection options, menus, tabs and so forth having multiple configurable dimensions, shapes, colors, text, data and sounds to facilitate operations with the interface. In addition, user inputs associated with the interface can also include a plurality of other inputs or controls for adjusting and configuring one or more aspects of the present invention. This can include receiving user commands from a mouse, keyboard, speech input, web site, browser, remote web service and/or other device such as a microphone, camera or video input to affect or modify operations of the user interfaces described herein.

Figure 6:
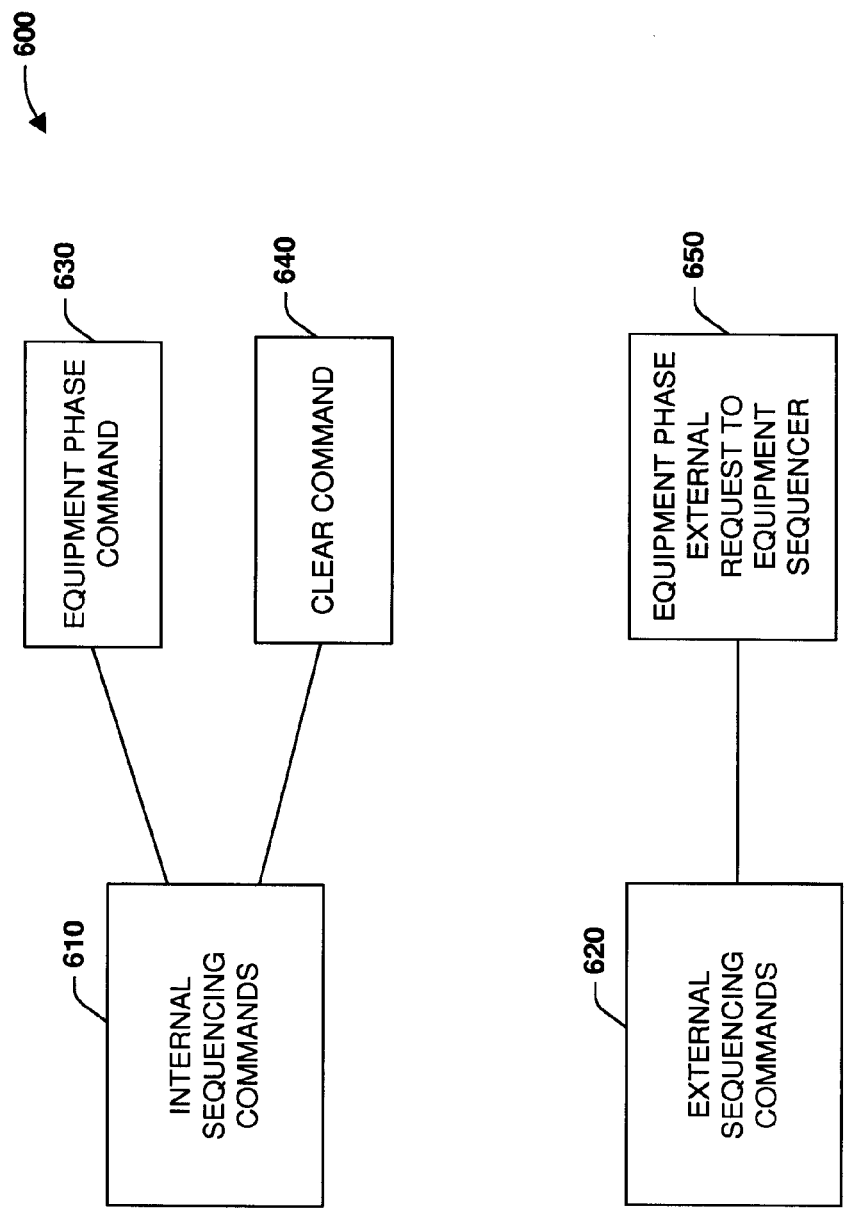
FIG. 6 is a diagram illustrating internal and external sequencing in accordance with an aspect of the present invention.

Referring now to FIG. 6, internal sequencing 610 and external sequencing 620 are illustrated in accordance with an aspect of the present invention. Internal sequencing 610 allows a routine to take ownership of and command (sequence) an equipment phase. The ability to sequence a phase can be implemented by an instruction—PCMD, for example at 630. In addition, an internal sequencer can clear a failure code in an equipment phase using a PCLF instruction, for example at 640. Internal Sequencing has at least some of the following features and benefits:

Allows for simple recipes (batch or otherwise) to be executed directly in the controller. These recipes would typically be implemented in a Sequential Function Chart (SFC). Also, a phase can command a phase allowing for hierarchies of recipes.

Provides faster processing than sequencing with an external sequencer since there is no communication overhead.

Can co-exist with an external sequencer. Both can command phases in the same controller but are generally protected from both sequencing the same phase.

Provides for consistency of phase logic—can write phase logic and use it with either type of sequencer.

Provides redundancy that an external sequencer doesn't generally provide. For example, when an internal sequencer is operating on a primary controller, a redundant internal sequencer can be operating on a secondary, hot-backup or tertiary controller, thus using an internal sequencer supports controller redundancy in both the primary and back-up systems since the internal sequencer can be operated concurrently in such systems.

The following describes some exemplary phase instructions:

| Instruction Name | Mnemonic | Description |
| --- | --- | --- |
| Equipment Phase Command | PCMD | Command an Equipment Phase to Start, Stop, Abort, Hold, Restart, Reset, Pause, and Resume. |
| Clear Equipment Phase Failure | PCLF | Clear the failure code in a failed Equipment Phase. |

Embedding an equipment phase in a controller as a native object allows external sequencers at 620 to use Control and Information Protocol (CIP) messaging (or other network protocols) to communicate with the sequencer or object at 650. Currently external sequencers (e.g., a Batch Server) use various tags via OLE for Process Control (OPC) to communicate to a controller although other techniques may be employed. The object mechanism of the present invention on the other hand provides a more reliable solution for communicating to a controller. In addition, the performance should be faster since handshaking and assurance of delivery is handled by Control and Information Protocol (CIP). Conventionally, integrity of data had to be ensured by multiple handshakes through tags, which required many more iterations. A PXRQ instruction, for example, allows phase logic to communicate to a Batch Server (or other external sequencer). The execution of this instruction uses a publish/subscribe/notify architecture described below. The following example provides a description of an external phase request instruction. It is to be appreciated that present invention is not limited to the example data structures shown.

| Feature | Description | |
|---|---|---|
| Representation | PXRQ<br>Equipment Phase External Request<br>Request Control<br>Request ?<br>Data Values ? | ⟨EN⟩<br>⟨ER⟩<br>⟨IP⟩<br>⟨PC⟩ |
| Request Control | Represents the control structure for the instruction.<br>This operand expects a tag of type<br>PHASE INSTRUCTION. | |
| Request | Represents the external request.<br>This operand expects a name of the external request.<br>When edited, an alphabetically sorted combo box is<br>displayed providing the available requests. | |
| | The Requests are:<br><br>Download Input Parameters<br>Download Input Parameters - Subset<br>Upload Output Parameters<br>Upload Output Parameters - Subset<br>Download Output Parameter Limits<br>Acquire Resources<br>Release Resources<br>Send Message to Linked Phase<br>Send Message to Linked Phase and Wait<br>Receive Message from Linked Phase<br>Cancel Messages to Linked Phase<br>Send Message to Operator<br>Clear Message to Operator<br>Generate Electronic Signature<br>Download Batch Data<br>Download Material Track Data Container in Use<br>Download Container Binding Priority<br>Download Sufficient Material<br>Download Material Track Database Data<br>Upload Material Track Data Container in Use<br>Upload Container Binding Priority | |
| Data Values | Represents the parameters and data values associated with the request.<br>This operand expects a tag integer array. The external sequencer defines the semantics of the data values for each request. | |

PHASE_INSTRUCTION Control Structure Definition

| FIELD | TYPE | DESCRIPTION |
|---|---|---|
| .STATUS | DINT | The .STATUS member provides access to the status members (bits) in one, 32-bit word.<br>Bit   Field<br><br>23   .AIP<br>24   .ABORT<br>25   .WA<br>26   .IP<br>27   .PC<br>28   .ER<br>31   .EN<br>Resetting any of the status bits while the instruction is enabled can cause unpredictable results. |
| .EN | BOOL | The enable bit is set when the rung-condition-in goes true and remains set until either the .PC bit or the .ER bit is set and the rung-condition-in is false. If the rung-condition-in goes false, but the .PC bit and the .ER bit are cleared, the .EN bit remains set |
| .ER | BOOL | The error bit is set when the controller detects that the request has failed. The .ER bit is reset the next time the rung-condition-in goes from false to true. |
| .IP | BOOL | The in-process bit is set when external sequencer has received the request and is processing it. The .IP bit is reset the next time the rung-condition-in goes from false to true. |
| .PC | BOOL | The process complete bit is set when the external sequencer has completed its processing of the request. Note that the nature of the processing depends upon the external sequencer and the type of request. The .PC bit is reset the next time the rung-condition-in goes from false to true. |
| .ABORT | BOOL | If one manually sets the .ABORT bit, the Equipment Phase aborts the request and sets the .ER bit. The .ERR value indicates whether or not the abort was successful. |
| ERR | INT | If the .ER bit is set, the error code word identifies error codes for the instruction. |
| EXERR | INT | If the .ER bit and ERR word are set, the extended error code word specifies additional error code information for some error codes. |
| .WA | BOOL | The wait acknowledgement bit is set when the request is sent to the external sequencer but not yet acknowledged.<br>This bit is cleared and the .IP bit is set when the external sequencer acknowledges receipt of the request. This bit is also cleared if the message could not be sent due to a connection timeout or network error, or if the request was aborted. |
| .AIP | BOOL | The "abort in process" bit is set when the external sequencer has received the aborting request and is processing it. |

| .ER | ERR | EXERR | Semantic Meaning |
|---|---|---|---|
| 1 | 0 | 0 | Request processing aborted internally. |
|   | 1 | 0 | Request processing aborted by external sequencer. |
|   | 2 | 0 | Same type of request is pending, only one same type of request is allowed |
|   | 3 |   | Communication error, request not delivered |
|   |   | 0x0110 | There is no subscriber subscribed to the phase |
|   |   | 0x0210 | There is no connection connect to the Notify object |
|   |   | 0x0410 | Delivery failed |
|   |   | 0x1010 | External Sequencer does not subscribe to receive the external request |
|   | 4 |   | Request process completed but failed |
|   | 2 |   | Error processing phase logic request |
|   | 3 |   | Invalid Request value passed |
|   | 4 |   | Request State Machine not in valid mode for request processing |
|   | 5 |   | Request Failed due to unsupported overlapping of Requests |
|   | 6 |   | Error storing to parameter tags at end of request processing |
|   | 5 | 0 | External sequencer received the request, but pass back invalid cookie |
|   | 6 | 0 | PXRQ send invalid parameter to external sequencer |

PXRQ Error and Extended Error Values

Figure 7:
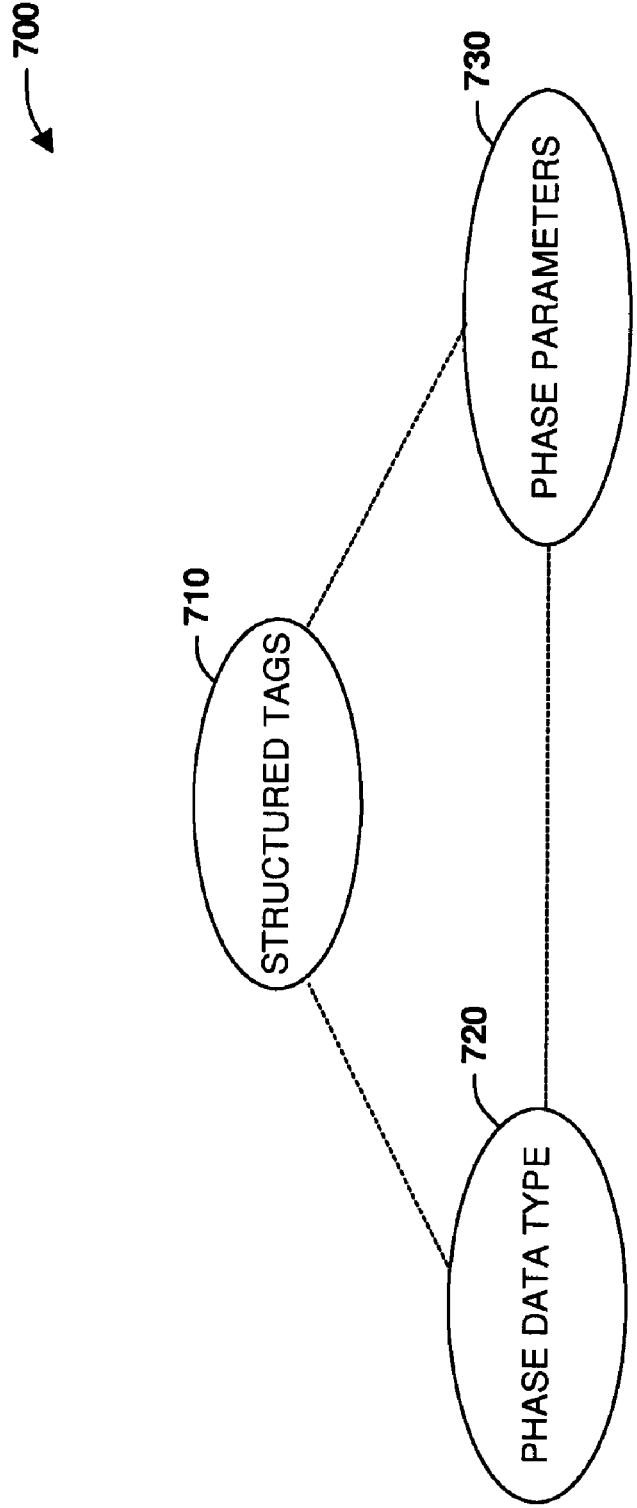
FIG. 7 is a diagram illustrating various data types in accordance with an aspect of the present invention.

Turning now to FIG. 7, various data types 700 are illustrated in accordance with an aspect of the present invention. The respective types can include structured tags 710, phase data types 720, and/or one or more phase parameters which are described in more detail with respect to FIG. 8. Each equipment phase, when created, typically has a tag 710 created based on a pre-defined (system defined) data type. This tag can be employed to monitor the state of the phase. The benefits of this is that it provides a consistent interface for the user to access phase data, and is consistent with how all other data in the controller is represented and accessed. At 720, a PHASE data type is a predefined data type within a controller. The user can manually create a tag based on the PHASE data type however that tag cannot generally be assigned to a new or existing Equipment Phase. An example PHASE data type can be defined as follows:

| Element | Type | Default Radix | Notes/Description | Tag Address & Update Methods |
|---|---|---|---|---|
| State | DINT | Decimal | Indicates the current State of the Equipment Phase as defined by the S88 State Model. This element is the rollup of all phase state bits as defined below. One state bit is set at a time. | Updated by Equipment Phase object due to: PCMD (Phase Command) Instruction execution. PSC (State Complete) Instruction execution. Request from commanding application(s) to change the state of the phase. |
| Running | BOOL | | Equipment Phase is Running. It has received a Start command and the Running logic is being scanned. Bit 0 | |
| Holding | BOOL | | Equipment Phase is Holding. It has received a Hold command and the Holding logic is being scanned. Bit 1 | |
| Restarting | BOOL | | Equipment Phase is Restarting. It has received a Restart command and the Restarting logic is being scanned. Bit 2 | |
| Stopping | BOOL | | Equipment Phase is Stopping. It has received a Stop command and the Stopping logic is being scanned. Bit 3 | |
| Aborting | BOOL | | Equipment Phase is Aborting. It has received an Abort command and the aborting logic is being scanned. Bit 4 | |
| Resetting | BOOL | | Equipment Phase is Resetting. It has received a Reset command and the Resetting logic is being scanned. Bit 5 | |
| Idle | BOOL | | Equipment Phase is Idle. It has completed executing its Resetting logic (if any). Bit 6 | |
| Held | BOOL | | Equipment Phase is Held. It has completed executing its Holding logic (if any) Bit 7 | |
| Complete | BOOL | | Equipment Phase is Complete. It has completed executing its Running logic (if any). Bit 8 | |
| Stopped | BOOL | | Equipment Phase is Stopped. It has completed executing its Stopping logic (if any). Bit 9 | |
| Aborted | BOOL | | Equipment Phase is Aborted. It has completed executing it's Aborting logic (if any). Bit 10 | |
| Substate | DINT | Decimal | Indicates the current Substate of the equipment phase. The Substate is typically used by Batch applications that have programmed breakpoints in their logic. This element is the rollup of all SubState bits as defined below. If the SubState is zero, the phase is not in any of the substates. Online Help: Reference a topic that describes the S88 State Model. | Updated by Equipment Phase object due to: PCMD (Phase Command) Instruction execution. PPD (Equipment Phase Paused) instruction execution. Causes Substate to change to Paused. Request from commanding application(s) Resume Command causes SubState to change to Normal Pause Command causes SubState to change to Pausing |

-continued

| Element | Type | Default Radix | Notes/Description | Tag Addess & Update Methods |
|---|---|---|---|---|
| | | | | SemiAuto Command causes SubState to change to SemiAuto |
| Pausing | BOOL | | Equipment Phase is Pausing. It has received a Pause command and will stop at the next programmed breakpoint.<br>Bit 0 | |
| Paused | BOOL | | Equipment Phase is Paused. It has stopped at a programmed breakpoint. The Resume command must be received before the phase will transition to the Running State.<br>Bit 1 | |
| AutoPause | BOOL | | The Equipment Phase is configured so that it does not require a Pause command to stop at the next programmed breakpoint. AutoPause can be thought of as triggering a "Pause" command automatically. AutoPause generally requires a Resume command to transition the phase to the Running state. | |
| StepIndex | DINT | Decimal | A user defined value typically used only by Batch applications to indicate the location (or progress made) in phase logic.<br>The value of the Step Index is application dependent. | Updated by user directly in Tag Editor<br>Updated by logic via general data manipulation instruction (example: MOV) |
| Failure | DINT | Decimal | A user defined value typically used only by Batch applications to save a failure (error) value. Higher values indicate the severity of the failure. To set this value, users use the PFL instruction. It is this instruction that enforces only higher values are written.<br>The value of the Failure is application dependent. | Updated by Equipment Phase object due to:<br>PFL (Equipment Phase Failure) instruction execution.<br>PCLF (Clear Equipment Phase Failure) instruction execution.<br>Request from commanding application(s) to clear the failure value. |
| UnitID | DINT | Decimal | A user defined value typically used only by Batch applications to indicate an ID of the Unit that owns the phase. | Updated by Equipment Phase object due to:<br>Request from commanding application(s) to set the Unit ID. |
| Owner | DINT | Hex | Indicates the current classes of owner of the equipment phase - the type of applications that are currently allowed to or waiting to command the phase. Low bits indicate the application type that is currently commanding the phase. | Updated by Equipment Phase object due to:<br>PATT (Phase Attach) instruction execution.<br>PDET (Phase Detach) instruction execution.<br>Request from commanding application(s) - Attach( )<br>Request from commanding application(s) - Override( ) |

Low 16 bits indicate the current state of the equipment phase ownership:
0000 0000 0000 0001 = 0x0001 = Bit 0 = External Sequencer
0000 0000 0001 0000 = 0x0010 = Bit 4 = Internal Sequencer
0000 0001 0000 0000 = 0x0100 = Bit 8 = HMI
0001 0000 0000 0000 = 0x1000 = Bit 12 = RSLogix 5000
Combinations of these bits indicate which applications currently own the phase, for example:
0x1001 = an External Sequencer and programming software both own the phase.
0x1111 = one of each type of application own the phase.
High 16 bits indicate the number of applications currently attached of each type
0000 0000 0000 0001 = 0x0001 = indicates number of External Sequencers, can only ever be one
0000 0000 0001 0000 = 0x0010 = indicates number of Internal Sequencers, can only ever be one -continued

| Element | Type | Default Radix | Notes/Description | Tag Address & Update Methods |
|---|---|---|---|---|
| 0000 xxxx 0000 0000 = 0x0x00 = indicates number of HMI Applications, from 0 thru 15 If more than 15 applications of this type own the phase that will not be indicated. xxxx 0000 0000 0000 = 0xx000 = indicates number of programming software Applications, from 0 thru 15. If more than 15 applications of this type own the phase that will not be indicated. Full Examples: 0000 0010 0000 0000 0000 0001 0000 0000 = 0x0200 0100 = 2 HMI's own the phase 0000 0100 0000 0001 0000 0001 0000 0001 = 0x0401 0101 = 4 HMI's own the phase and they have overridden an External Sequencer 1000 0000 0001 0000 0001 0000 0001 0000 = 0x8010 1010 = 8 programming software workstations have overridden an Internal Sequencer ||||
| PendingRequest | DINT | Decimal | Rollup of all PendingRequest bits defined below. Typically only used for communication with an external sequencer like the Batch Server. | Updated by Equipment Phase object due to: PXRQ instruction execution PXDT instruction execution Request completion indication from commanding application(s) |
| DownloadInputParameters | BOOL | | Input parameters are being transferred to the Equipment Phase. Bit 0 | |
| DownloadInputParametersSubset | BOOL | | A subset of input parameters are being transferred to the Equiment Phase. Bit 1 | |
| UploadOutputParameters | BOOL | | The Equipment Phase is transferring output parameters to an external sequencer. Bit 2 | |
| UploadOutputParametersSubset | BOOL | | The Equipment Phase is transferring a subset of output parameters to an external sequencer. Bit 3 | |
| DownloadOutputParameterLimits | BOOL | | Input parameter limits are being transferred to the Equipment Phase. Bit 4 | |
| AcquireResources | BOOL | | The Equipment Phase is requesting the Batch Server to acquire a pre-configured resource. Bit 5 | |
| ReleaseResources | BOOL | | The Equipment Phase is requesting the Batch Server to release a pre-configured resource. Bit 6 | |
| SendMessageToLinkedPhase | BOOL | | The Equipment Phase is sending a message to another phase via the Batch Server. The phases are "linked". The Equipment Phase is not waiting for the message to reach its destination. Bit 7 | |
| SendMessageToLinkedPhaseAndWait | BOOL | | The Equipment Phase is sending a message to another phase via the Batch Server. It is waiting for the message to reach its destination The phases arc "linked". Bit 8 | |
| ReceiveMessageFromLinkedPhase | BOOL | | The Equipment Phase is receiving a message from another phase. The phases are "linked". Bit 9 | |
| CancelMessageToLinkedPhase | BOOL | | The Equipment Phase is canceling a message it sent to another phase via the Batch Server. The phases are "linked". Bit 10 | |
| SendMessageToOperator | BOOL | | The Equipment Phase is sending a message to the Batch Server that is to be displayed on the Batch View for the operator. Bit 11 | |
| ClearMessageToOperator | BOOL | | The Equipment Phase is clearing a message previously sent to the Batch Server for display on the Batch View. Bit 12 | |

-continued

| Element | Type | Default Radix | Notes/Description | Tag Addess & Update Methods |
|---|---|---|---|---|
| GenerateESignature | BOOL | | Bit 13 | |
| DownloadBatchData | BOOL | | Bit 14 | |
| DownloadMaterialTrackDataContainerInUse | BOOL | | Bit 15 | |
| DownloadContainerBindingPriority | BOOL | | Bit 16 | |
| DownloadSufficientMaterial | BOOL | | Bit 17 | |
| DownloadMaterialTrackDatabaseData | BOOL | | Bit 18 | |
| UploadMaterialTrackData ContainerInUse | BOOL | | Bit 19 | |
| UploadContainderBindingPriority | BOOL | | Bit 20 | |
| UploadMaterialTrackDatabaseData | BOOL | | Bit 21 | |
| AbortingRequest | BOOL | | The Equipment Phase is aborting the current request. Bit 22 | |
| NewInputParameters | BOOL | | Indicates to the equipment phase that a new parameter or parameters may be available to it. The Phase should monitor this value and, when it is set, call the PRNP instruction to clear this bit. | Updated by Equipment Phase object due to: Request from commanding application(s) to indicate that new parameters are available. PNP (Equipment Phase New Parameters) instruction execution clears this. |

Figure 8:
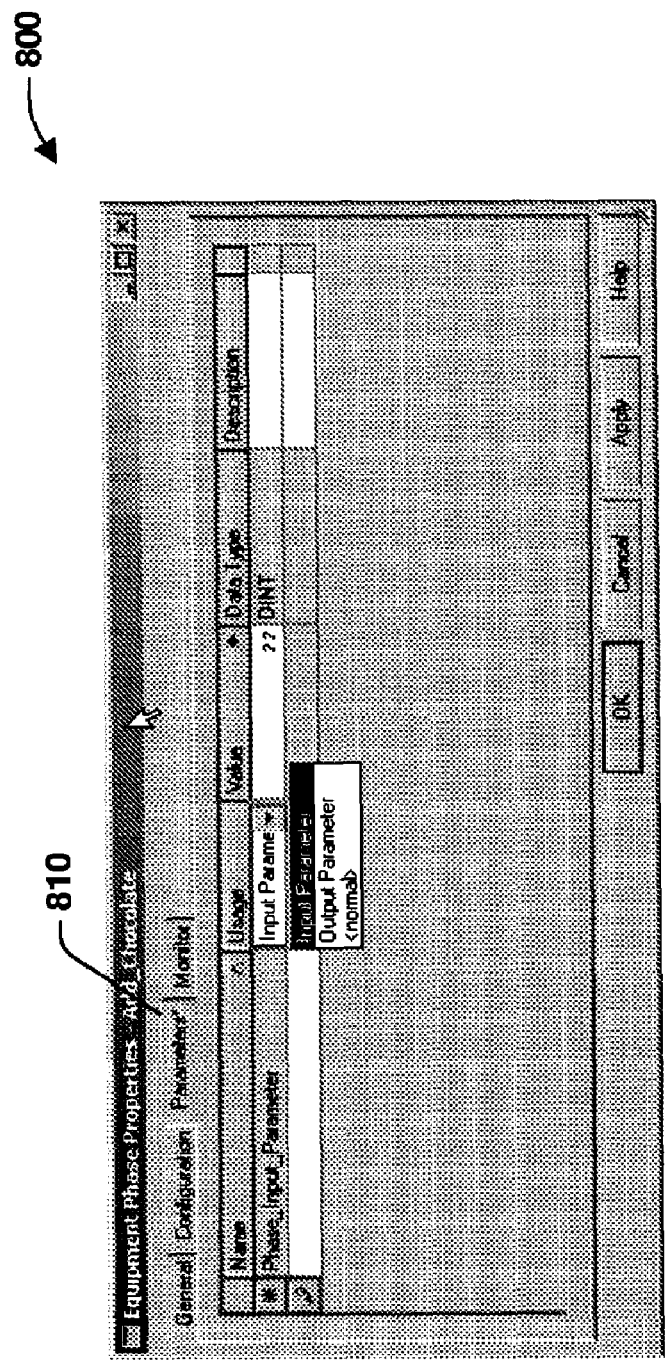
FIG. 8 illustrates an example interface for entering phase parameters in accordance with an aspect of the present invention.

FIG. 8 illustrates an example interface 800 for entering phase parameters in accordance with an aspect of the present invention. Phases can have Input and Output parameters to provide a mechanism to transfer information to and from an equipment phase. Parameters are scoped to a phase to allow encapsulation of a phase's data and provide for easier reuse. Parameters are generally created as "normal" tags, and then assigned to be a parameter on a phase. One method is shown on the interface 800 on a parameters tab 810 associated with the phase properties.

Figure 9:
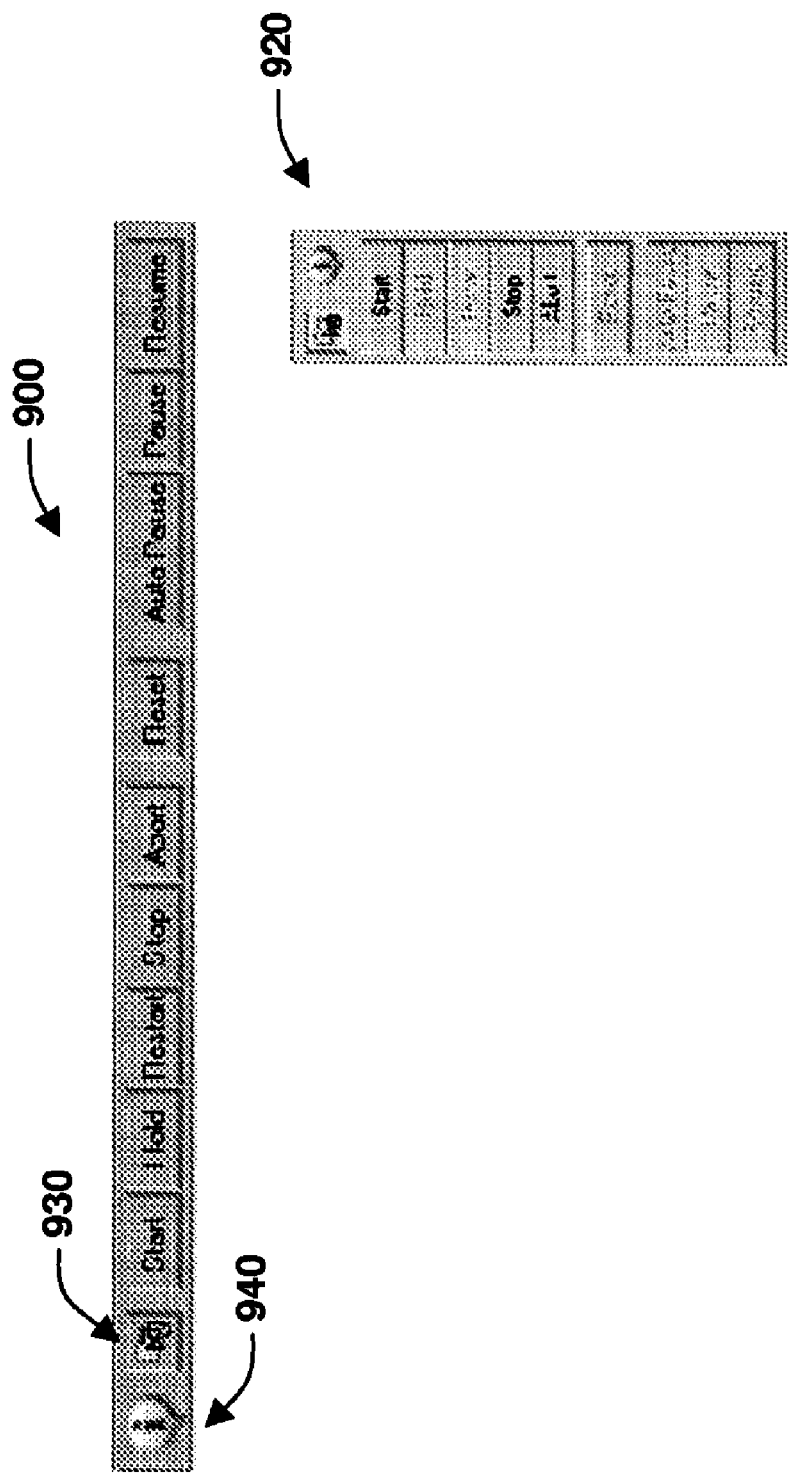
FIG. 9 illustrates a phase toolbar in accordance with an aspect of the present invention.

FIG. 9 illustrates a phase toolbar 900 in accordance with an aspect of the present invention. An alternative arrangement can be provided as depicted at 920 (e.g., dragging and docking toolbar of 900). The toolbar 900 provides the following functions and features:

Allows a user to monitor the current state, owner, and fault information for a phase, via a dynamically updating tooltip that has no timeout value (does not disappear after a timeout, disappears when the mouse is moved, for example).

Allows a user to take ownership of a phase which can be confirmed (e.g., by a dialog window) to promote safety.

Allows a user to command a phase (sequence it)—command the phase without writing code to force particular state logic to be executed. This commanding is achieved in the context of the currently executing logic and not independent of it as would be done via an external HMI, for example. This is beneficial during a troubleshooting and commissioning stage of a project, for example.

An external or internal sequencer can send a state transition command to the Equipment Phase. The phase determines if the command is valid for its current state, and if it is, transitions to the appropriate/next state based on its state machine. Controller programming software provides manual commanding of an Equipment Phase. When online with an opened routine that belongs to an Equipment Phase, an Equipment Phase Command toolbar 900 can be displayed. Using this toolbar, users can command the Equipment Phase owning the online routine. To command an Equipment Phase, users first take ownership of the Equipment Phase. This is achieved by depressing a button at 930. Until then, other buttons are disabled. The following provides an exemplary functional description of various buttons appearing on the toolbar 900:

| Feature | Description |
|---|---|
| See reference numeral 940 of FIG. 9. | Information hotspot. When hovering the mouse over this icon, a tooltip is displayed showing the following information about the Equipment Phase. Name of the Equipment Phase Owner of the equipment Phase. This information comes from the Phase Tag. Thus, this will show a value even when offline. Current state of the Equipment Phase. This information comes from a Phase Tag. Thus, this will show a value even when offline. Current Substate of the Equipment Phase. This field is not displayed if there is no substate (if the tag element is zero). This information comes from the |

Equipment Phase: TransferOut
Owner: RSLogix 5000
State: Running
Substate: Paused
Failure: <some number>

-continued

| Feature | Description |
|---|---|
| | Phase Tag. Thus, this will show a value even when offline.<br>Failure code. This entire field is not displayed the failure code is zero (the tag element is zero). This information comes from the Phase Tag. Thus, this will show a value even when offline.<br>This tooltip stays open as long as the mouse is over this hotspot. While open, the information within the tooltip is kept up todate. |
| See reference numeral 930 of FIG. 9 | Ownership Phase Icon. This toolbar button acts like a toggle button. When the instance of controller programming software has ownership of the Equipment Phase, this button remains down.<br>The command buttons are disabled as long as this instance of controller programming software does not own the Equipment Phase (this button is up).<br>Along with the information about what this button is, the tooltip for this button also displays the Equipment Phase's owner, state and substate. 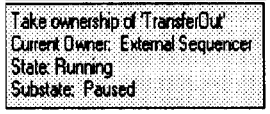 |
| Start | Requests the Equipment Phase to go into the Start state.<br>Enabled when controller programming software is online, has ownership and the Equipment Phase is in the Idle state, and the Equipment Phase is not inhibited. |
| Hold | Requests the Equipment Phase to go into the Hold state.<br>Enabled when controller programming software is online, has ownership, the Equipment Phase is in the Running, or Restarting state, and the Equipment Phase is not inhibited. |
| Restart | Requests the Equipment Phase to go into the Restart state.<br>Enabled when controller programming software is online, has ownership, the Equipment Phase is in the Held state, and the Equipment Phase is not inhibited |
| Stop | Requests the Equipment Phase to go into the Stop state.<br>Enabled when controller programming software is online, has ownership, the Equipment Phase is in the Running, Holding, Restarting, Resetting, Idle, or Held state, and the Equipment Phase is not inhibited |
| Abort | Requests the Equipment Phase to go into the Abort state.<br>Enabled when controller programming software is online, has ownership, the Equipment Phase is in the Running, Holding, Restarting, stopping, Resetting, Idle, or Held state, and the Equipment Phase is not inhibited |
| Reset | Requests the Equipment Phase to go into the Reset state.<br>Enabled when controller programming software is online, has ownership, the Equipment Phase is in the Complete, Stopped, or Aborted state, and the Equipment Phase is not inhibited |
| Auto Pause | Requests the Equipment Phase to tam on Auto Pausing. Auto pausing is a substate that causes the phase to automatically pause at the next programmed breakpoint. It mitigates the need to continually issue the Pause command.<br>This toolbar button acts like a toggle button. Meaning, when Auto Pausing is on, the button is latched (it remains depressed). When Auto Pausing is off, the button isn't depressed. Disabled when the Equipment Phase in inhibited. |
| Pause | Request to Equipment Phase to pause at the next programmed breakpoint. After this, the Resume command is sent before the Equipment Phase will transition back to the running state.<br>This button is enabled when the Equipment Phase is in the Running state.<br>User programmed breakpoints are set using the PPD instruction.<br>Enabled when controller programming software is online, has ownership and the Phase is not inhibited. |
| Resume | Requests the Equipment Phase to resume running from the Paused substate.<br>The Equipment Phase should be in the Paused substate in order for this button to be enabled. This is disabled if the Equipment Phase is inhibited. |

It is noted that Equipment Phases in the Equipment Model should be "owned" before they can be commanded (sequenced). In past Batch implementations, ownership was a single bit value for either a Batch Server or an HMI. Since this value is a tag, there are no mechanisms to enforce rules regarding the ownership or commanding. With the Equipment Model, the ownership rules are intrinsic to the Equipment Phase object and it can enforce these rules. The equipment phase enforces priorities as shown in the table below.

| Application | Priority |
| --- | --- |
| Controller Programming Software | 2 (Highest) |
| HMI | 1 |
| External or Internal Sequencer | 0 (Lowest) |

The controller programming software has the highest priority and can "Override" an application that is currently commanding the phase. This is to support operator troubleshooting needs. In contrast, sequencers are lowest priority and cannot override HMI's or controller programming software. The equipment phase enforces these priorities, and tracks which application has been overridden, so that when a higher priority application has detached, the lower priority application can begin to command the phase again. A controller programming software user takes ownership of a phase by using the Phase commanding toolbar 900, whereas an HMI generally takes ownership of a phase via CIP messaging (or other type). An external sequencer takes ownership via CIP or other type messaging as well. Internal Sequencers employ PATT and PDET to attach (own) and detach (stop owning) instructions as shown below:

| Instruction Name | Mnemonic | Description |
| --- | --- | --- |
| Attach to an Equipment Phase | PATT | Request to Attach to an Equipment Phase for the purposes of calling the PCMD or PCLF instructions. If a Server is commanding an Equipment Phase, then internal sequencers call this instruction before the PCMD or PCLF instruction can be called. If there is no Server, then using this and the PDET instruction is an optional protocol for users. |
| Detach from an Equipment Phase | PDET | Detach from an Equipment Phase after calling the PCMD or PCLF instructions. If a Server is commanding an Equipment Phase, then internal sequencers call this instruction after the PCMD/PCLF instruction is called. If there is no Server, then using this and the PATT instruction is an optional protocol for users. |

Figure 10:
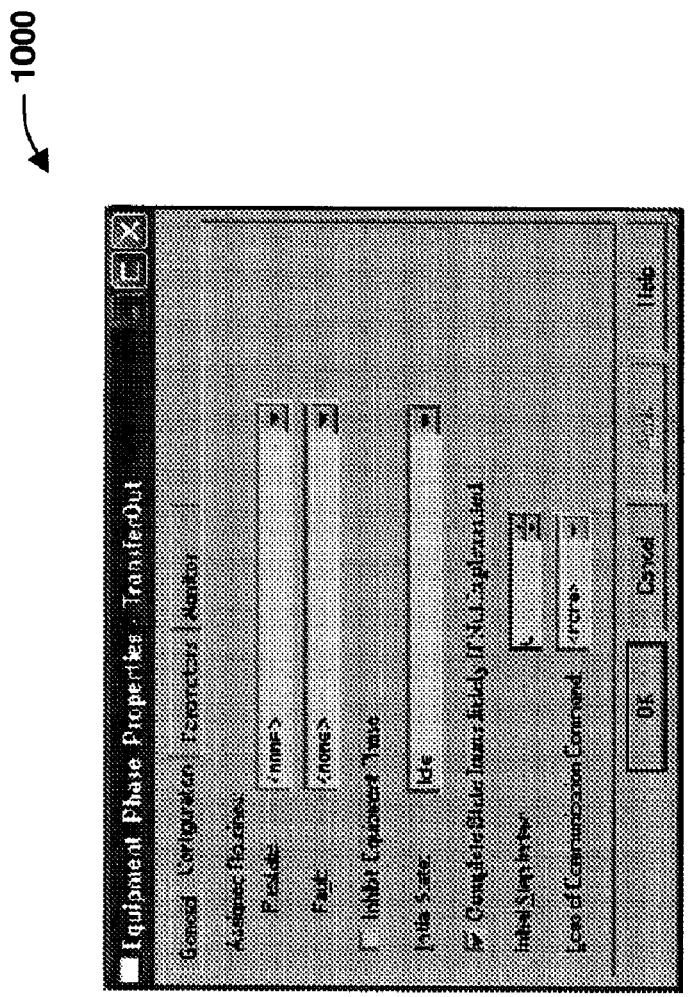
FIG. 10 illustrates an example interface supporting a hybrid control system in accordance with an aspect of the present invention.

FIG. 10 illustrates an example interface 1000 supporting a hybrid control system in accordance with an aspect of the present invention. Embedding Equipment phase objects into a controller with the behaviors, configuration options, and data as described above, facilitates integrating Batch or other type control servers into an integrated architecture that already contains sequential, motion, and continuous process control, for example.

Elements of the areas described above can have some Batch specific elements to allow for tighter integration of Batch products with controller products. This list includes:

Configuration options for use with the Batch Server: Initial State, Initial Step Index, External Sequencer Loss of Communication Command, and External Request Hold Action as shown in the interface 1000.

Input and Output parameter tags.

PXRQ instruction to communicate with an External Sequencer such as a Batch Server, for example.

Phase failure in the phase tag, PFL instruction to set it, PCLF instruction to clear.

Phase tag data specific to Batch such as: Step Index, Failure, Pending Request, and New Input Parameters.

Batch specific instruction to reset new parameters—PRNP.

In addition, the ability to employ internal sequencing allows sequencing of simple batch recipes directly into the controller.

Figure 11:
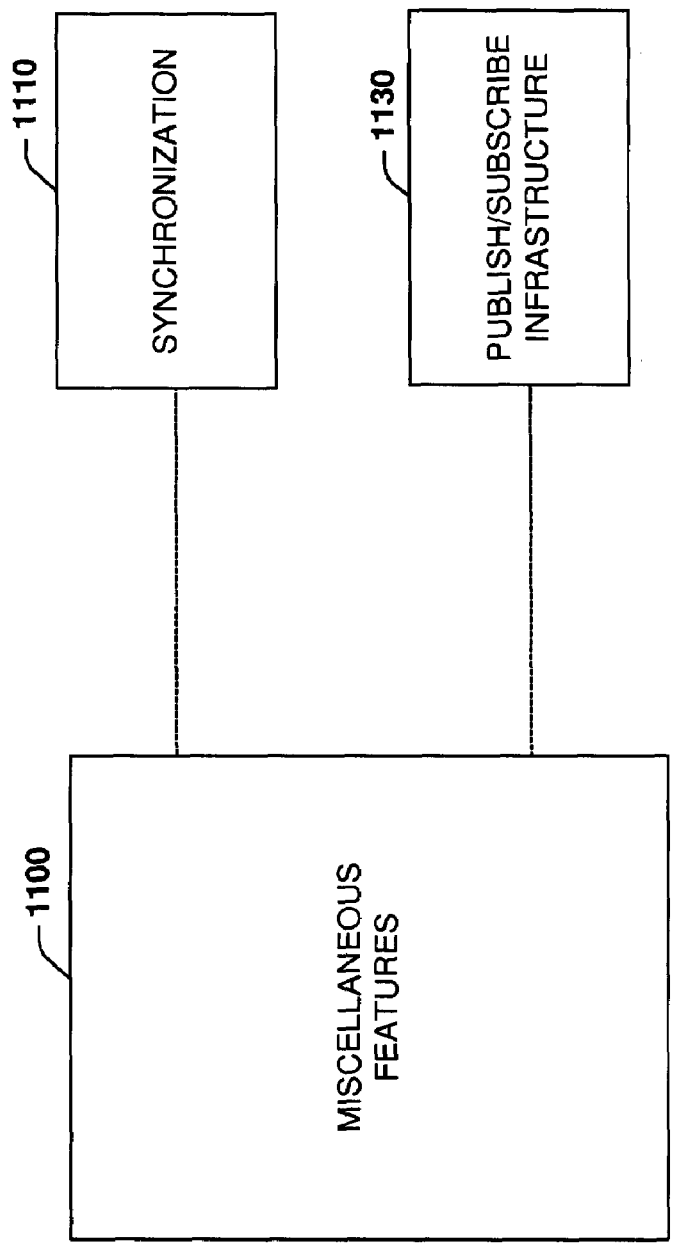
FIG. 11 illustrates miscellaneous aspects in accordance with the present invention.

FIG. 11 illustrates miscellaneous aspects 1100 in accordance with the present invention. Proceeding to 1110, synchronization aspects are provided. The Equipment Model provides a mechanism referred to as synchronization to help Batch users workflow as they move between the Batch tools and controller programming software tools. The basic concepts are that the user does not have to type the same thing twice and that the applications facilitate so that the user does not make mistakes. In a conventional Batch Equipment Editor, for example, the user must enter all of their Equipment Phase names as well as the input and output parameter names for each phase. They must then manually replicate this same information in the controller programming software. With synchronization of the present invention, they enter the data once—either in the Equipment Editor or controller programming software—and then press a synchronization button at which point the system updates the data across system and tool boundaries.

From the system design perspective, each tool—the Equipment Editor and controller programming software—generally continues to manage its own data store. The Equipment Editor controls an Area Model, whether it is in a binary file, an XML file, or an electronic directory, for example. The controller programming software controls its project file and data maintained within it. The tools communicate via programmatic interfaces, and thus, the internal design and architecture of each application is minimally impacted by the synchronization functions.

At 1130, an event and subscription architecture can be provided. The ability for a phase to communicate with an external sequencer can be built upon Publish/Subscribe/Notify infrastructure. This infrastructure can be designed and layered as such so as to be common and be used by the Equipment Model feature and Alarms & Events features, and/or and other features that may need such communication schema. In one aspect a general dynamic publisher/subscriber mechanism is provided which can be used for a variety of applications such as a part of an overall event and alarm infrastructure that is applicable on CIP or other network devices. For example, a CIP event and alarm infrastructure, one of the first applications of a dynamic publisher/subscriber mechanism can be described as a three-layer architecture having:

CIP Layer—corresponds to specification of Control and Information Protocol.

CIP Dynamic Publisher/Subscriber Layer—defines general dynamic publisher/subscriber mechanism allowing an arbitrary set of devices (subscribers) to register themselves to be notified about information published by another device (publisher).

CIP Notification Layer—specifies behavior of notifications such as CIP alarms and events. This layer utilizes the CIP dynamic publisher subscriber mechanism for delivering of information about current states of CIP alarms and events to subscribers. The infrastructure allows devices supporting the CIP protocol to be notified about occurrence of some specific events (i.e., controller events, alarms) generally called alerts published by a CIP publisher. Consequently, CIP alert publishers can send alert data to registered CIP subscribers. The infrastructure also provides services which allow the subscribers to register and acknowledge (if necessary) alerts published by CIP publisher, and to obtain their current status. Alert is a general abstract term representing a possible occurrence detectable by a publisher which can be of interest to the subscribers. Generally, publisher/subscriber communication is based on a model where nodes are publishing and subscribing to data. A network device can be a publisher, a subscriber, or both. A publisher can send the same data to many registered subscribers.

Figure 12:
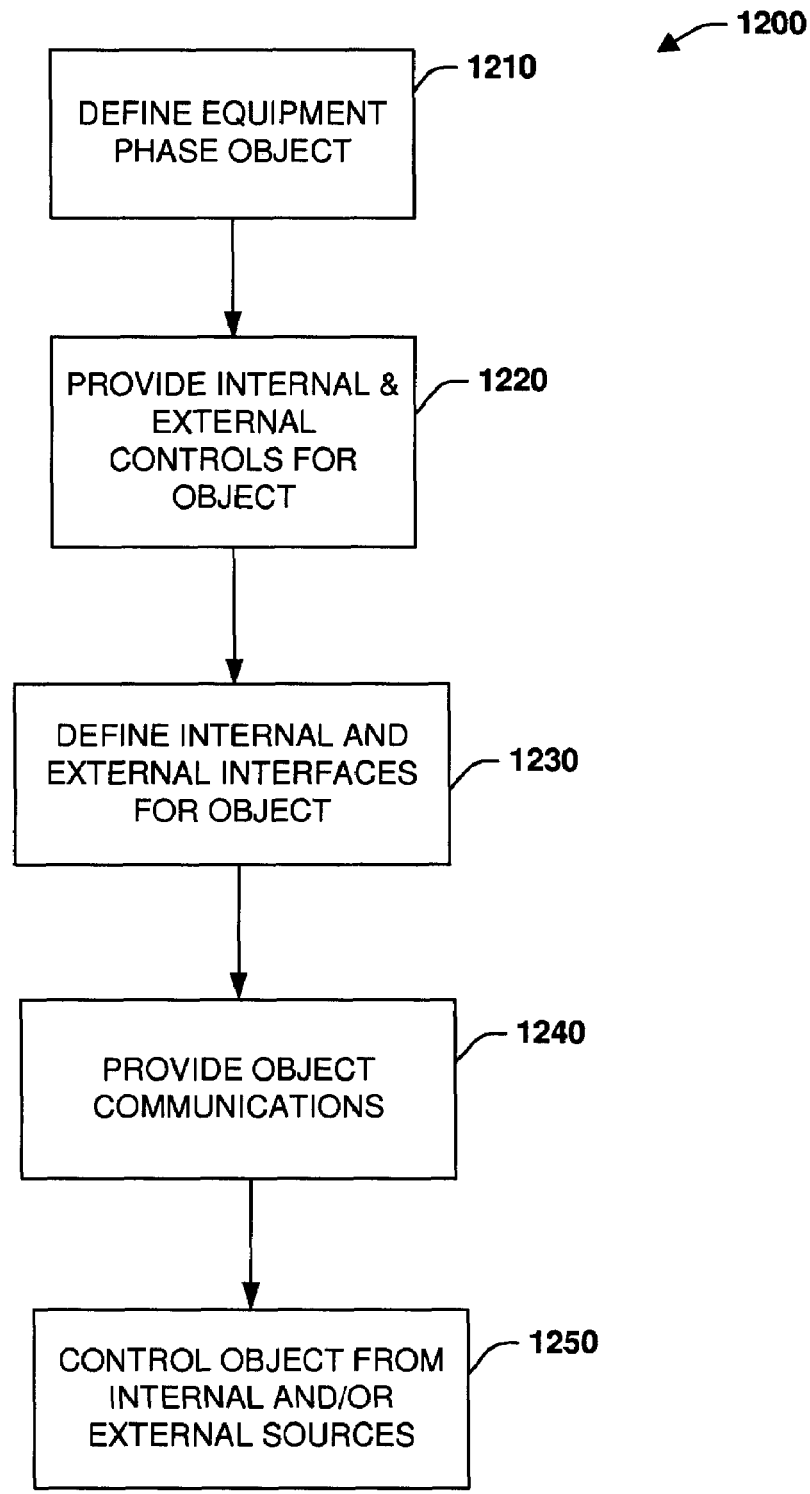
FIG. 12 is a flow diagram illustrating sequence-driven processing in accordance with an aspect of the present invention.

FIG. 12 illustrates a sequence driven methodology 1200 in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 1210 of the process 1200, one or more equipment phase objects are defined. Such objects can include various functionalities as previously described for managing associated states and interacting with various processes. At 1220, one or more internal and/or external controls are provided for the equipment phase object to enable internal process and/or external processes to control the object. For example, such controls can include instructions that cause the object to transition from one state to a subsequent state. At 1230, one or more internal and/or external interfaces can be defined for the object. Such interfaces allow entities such as users and/or machine to manipulate the object. This can include graphical user interfaces for controlling, configuring, and/or monitoring a respective object. At 1240, one or more communications options are provided to interact with the object and associated state machine. Such communications can include factory protocols such as CIP or more general protocols such as TCP/IP. Also, respective protocols can be employed in the framework of a general notification architecture, wherein events are published by a provider and subscribed to from a recipient. At 1250, after the above communications, controls, and interfaces are defined, the object can be controlled from instructions internal to a controller and/or controlled from a sequencer or other type machine that communicates over a network to the controller wherein the object resides.

Figure 13:
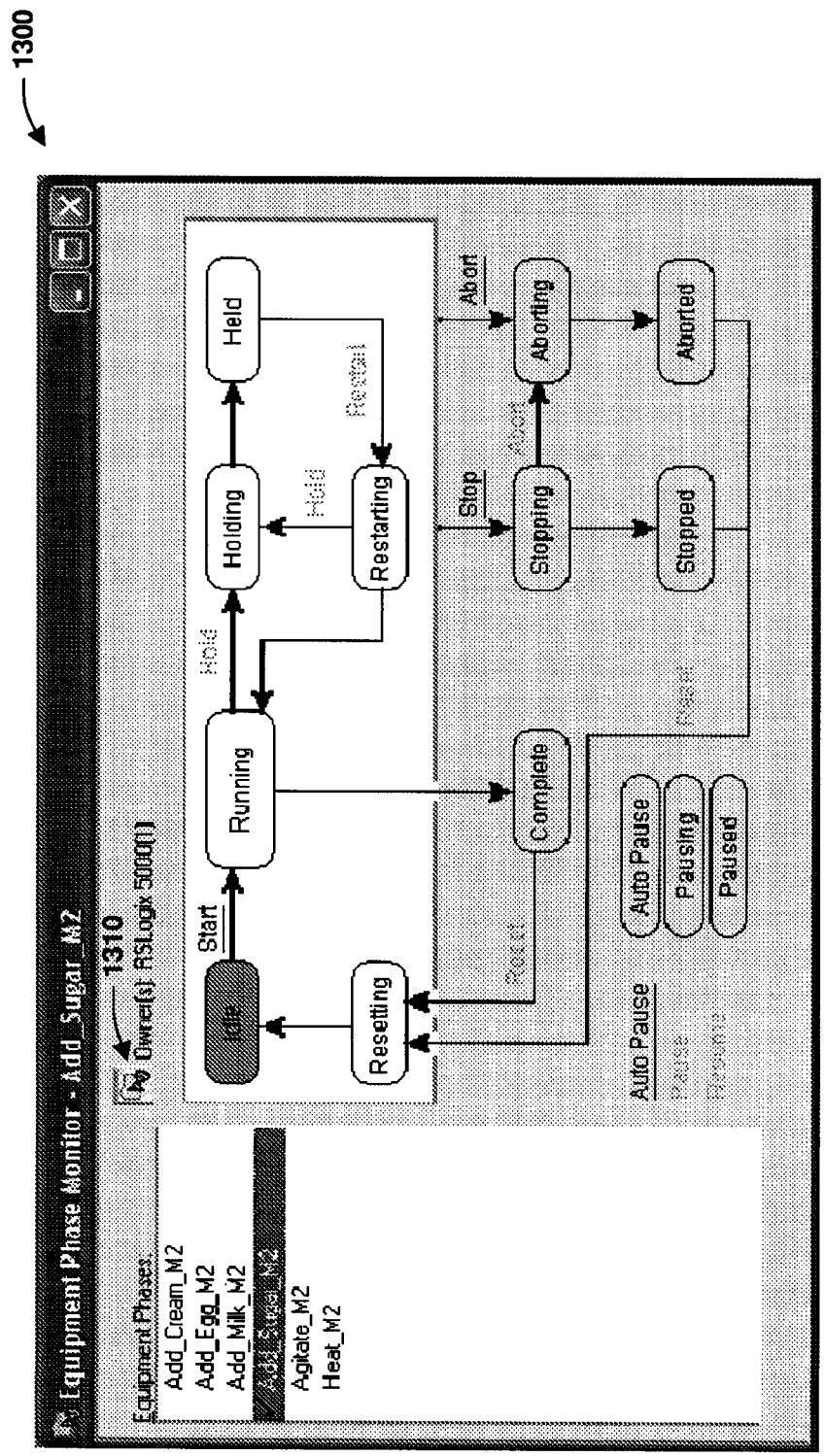
FIG. 13 is an example user interface for monitoring equipment phases in accordance with an aspect of the present invention.
Figure 14:
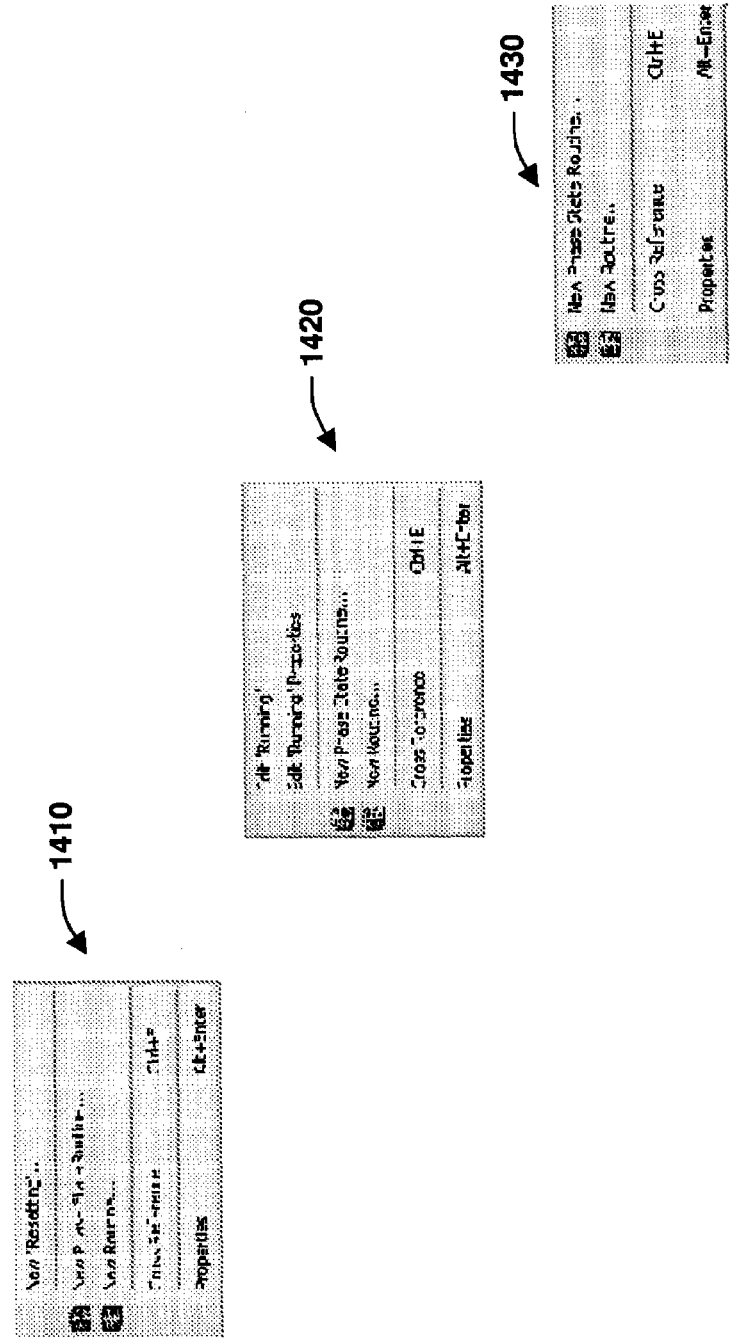
FIG. 14 illustrates example context menus in accordance with an aspect of the present invention.

FIG. 13 is an example user interface 1300 for monitoring and sequencing equipment phases in accordance with an aspect of the present invention. FIG. 14 illustrates context menus 1400 that may be employed in accordance with the interface 1300. Various aspects of the interface 1300 include:

A user can request ownership directly from the graphic.

Phases can be commanded/sequenced directly from the graphic.

The graphic shows the types of owners and the number of owners for each phase.

The user can navigate directly to logic from the graphic through a menu or double click, however it is to be appreciated not that other navigation mechanisms are possible.

The user can create logic for unimplemented states directly from the graphic through a menu or double click, however it is to be appreciated that other navigation mechanisms are possible.

The graphic is re-sizeable and retains its proportions. Thus, it can be used in conjunction with developing/debugging logic as well as in a large format for easy viewing across a control room, for example.

With the Equipment Phase Monitor toolbar described above, users are generally allowed to monitor and command an Equipment Phase from within an open Equipment Phase State routine. Launched from a top-level menu or Controller Organizer's context menu, an Equipment Phase Monitor window such as depicted by the interface 1300 allows users to monitor and command all Equipment Phases within the opened project.

| Feature | Description |
| --- | --- |
| MDI Child | The Equipment Phase Monitor window is a MDI child window that automatically closes when the project is closed and updates as changes occur to Equipment Phases.<br>This window contains a list of Equipment Phases to monitor/command and a graphic that displays the state/commands for the selected Equipment Phase. Along with the MDI child window title ("Equipment Phase Monitor"), the title also displays which Equipment Phase is currently being monitored (e.g., Add Cream). If no Equipment Phases are being monitored, the window title merely reads "Equipment Phase Monitor". |

-continued

| Feature | Description |
| --- | --- |
| Equipment Phase List | This single selection alphabetically sorted list of Equipment Phases displays the list of Equipment Phases to monitor. The Equipment Phase that's being monitored is the currently selected Phase within this list. Thus, selecting a different Equipment Phase stops monitoring one and starts monitoring the newly selected one. A Tooltip can be displayed when hovering the mouse over a particular Equipment Phase. |
| Owning an Equipment Phase | From the Equipment Phase Monitor window, users can view who owns and takes owner ship of one or more Equipment Phases.<br>The list of current owners is shown as a comma separated list to the right of the Take Ownership button 1310. Pressing the Take Ownership Button at 1310 allows users to take ownership of the Equipment Phase currently selected in the Equipment Phase Ust.<br>Attaching to an inhibited or unscheduled Equipment Phase or an equipment phase in a task that is inhibited is not allowed. But, taking ownership of an inhibited Equipment Phase is allowed as users may want to control the Equipment Phase when un-inhibiting it. |
| Equipment Phase State Graphic | The Equipment Phase State graphic shows the current state of the selected Equipment Phase by highlighting the current state.<br>When Phase Monitor window resizes the Phase State Gaphic, the graphic display is scaled to fit the new size. Thus, making the MDI child bigger increases the size of the state graphic (like zooming in).<br>For the commands that are shown as URL links, the cursor (when it is over the link) is changed to be the pointing hand. This signifies to users that they can click on the command.<br>Right mouse clicking on the State Graphic displays the following context menus depicted at 1410, 1420, and 1430 of FIG. 14.<br>Clicking on an Equipment Phase State when an Equipment Phase is being monitored and the particular state is not implemented see interface 1410.<br>Clicking on an Equipment Phase State when an Equipment Phase is being monitored and the particular state is implemented see interface 1420.<br>Cicking anywhere else or when no Equipment Phase is being monitored see interface 1430.<br>The Cross Reference and Properties menu items both work off of current |
| Commanding Equipment Phases | If an Equipment Phase is owned, and a particular state is allowed to be sent, the state is shown like a blue URL link. In this case, dicking the state graphic sends the command to the currently monitored Equipment Phase. If the command fails an error message is displayed explaining why the command failed. |

What have been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An automation system embodied on a computer readable medium that when executed on one or more processors facilitates automated industrial processing implemented as network interconnected controllers interacting with an industrial controller supporting execution of an industrial batch process, the system comprising:

an equipment phase object that is executed within the industrial controller, wherein the equipment phase object is accessible by at least one of internal instructions from within the industrial controller to control the equipment phase object and external instructions directed to the industrial controller from one or more of said network external controllers to at least one of access data, interact or control objects associated with the equipment phase object to affect operations within the industrial controller;

a plurality of state machines that operate at multiple levels of the industrial batch process, wherein the plurality of state machines are instantiated from within one or more of said controllers external to the industrial controller and direct the external instructions via the network to the industrial controller to control the equipment phase object to affect operation of the industrial controller, wherein each of the plurality of state machines executes a portion of the industrial batch process, the equipment phase object further operable for maintaining information related to at least one of configuration, state or execution associated with the industrial batch process pertinent to the industrial controller; and wherein the equipment phase object upon concurrently receiving at least two instructions from one or more of said multiple levels of state machines, manages the at least two concurrently received instructions according to prioritization rules, wherein one or more of the at least two instructions is an instruction originated from said external state machines and directed as one or more concurrent external client requests to the prioritization service of the equipment phase object for synchronization in accordance to the rules.

2. The system of claim 1, further comprising a sequencing engine operating with the equipment phase object to facilitate automated industrial processing.

3. The system of claim 2, wherein the sequencing engine is adapted to an S88 industrial state model.

4. The system of claim 3, further comprising a resetting state to facilitate operations in an industrial process.

5. The system of claim 1, further comprising a program object that interacts with the equipment phase object.

6. The system of claim 1, further comprising a pause instruction to enable breakpoints to be set within a program.

7. The system of claim 1, further comprising:
an interface to configure at least one of a pre-state routine, a fault routine, or an initial state;
a component to allow a phase to send a command to the phase upon loss of communications with an external sequencer; and
a component to enable state machine implementation in a plurality of programming languages.

8. The system of claim 1, further comprising at least one of an internal sequencing command or an external sequencing command to access the equipment phase object.

9. The system of claim 1, further comprising a publisher component to send at least one notification to the system.

10. The system of claim 9, further comprising a subscriber component to receive the at least one notification.

11. The system of claim 1, further comprising a phase toolbar to interact with the equipment phase object.

12. The system of claim 1, further comprising a component to synchronize parameters between interface components.

13. The system of claim 1, further comprising at least one structured tag, phase data type, and phase parameter to interact with the equipment phase object.

14. The system of claim 1, further comprising at least one of a secondary equipment phase object or a secondary sequencing engine operated in a redundant controller system.

15. The system of claim 1, further comprising at least one batch processor to facilitate operations of the state machines.

16. The system of claim 15, wherein the state machines are provided for a subset of steps within a recipe.

17. The system of claim 15, wherein the state machines are provided for at least one of the following control operations: for each instance of an equipment module; an operation recipe step the equipment phase module is associated with; a unit procedure recipe step the operation recipe is associated with, and a batch procedure the unit procedure recipe step is associated with.

18. The system of claim 15, wherein the state machines interact with multiple controller objects that are distributed across multiple controllers.

19. The system of claim 1, wherein the equipment phase object at least one of enforces a state machine, provides services to command a phase, manages state routines, scans a routine based on an active state, provides services for sequencing engines to manage tags for parameter and report values, exposes state data for internal and external clients, provides configuration options and services for handling failures, holds, and restarts, provides services to report and clear phase failures, and provides services to request ownership of the phase and enforcing rules of ownership.

20. The system of claim 1, further comprising one or more phase instances that have an entry point to serve as a binding interface to a program.

21. A method to facilitate automated sequential processing in a network of interconnected controllers interacting with an industrial controller supporting execution of an industrial batch process, comprising:
defining an equipment phase object within an industrial controller wherein the equipment phase object is simultaneously accessible by a plurality of state machines that operate at multiple levels of the industrial batch process, wherein the plurality of state machines are instantiated from within one or more of the network controllers external to the industrial controller;
associating internal controls within the controller and external controls to the equipment phase object;
associating the plurality of state machines with the equipment phase object, wherein the plurality of state machines direct the external controls via the network to the industrial controller to at least one of access data, interact or control objects associated with the equipment phase object to affect operation of the industrial controller, the equipment phase object further operable for maintaining information related to at least one of configuration, state or execution associated with the industrial batch process pertinent to the industrial controller; and
executing the equipment phase object from at least one of the external or internal controls, wherein the object upon concurrently receiving at least two controls from one or more of said multiple levels of state machines, manages the at least two concurrently received controls according to prioritization rules, wherein one or more of the at least two concurrently received controls is a control originated from said external state machines and directed as one or more concurrent external client requests to the prioritization service of the equipment phase object for synchronization in accordance to the rules.

22. The method of claim 21, further comprising interfacing a sequencing application that queries a phase.

23. The method of claim 22, further comprising determining if the phase is owned.

24. The method of claim 23, further comprising reserving the phase for a sequencer if the phase is not busy or returning an error if the phase is busy.

25. The method of claim 22, further comprising overriding the sequencing application and notifying a sequencer that its ownership has changed.

26. The method of claim 21, further comprising providing sub states in addition to S88 state model definitions.

27. The method of claim 21, further comprising defining a pause instruction to trigger a breakpoint in at least one state machine.

28. The method of claim 27, further comprising providing a resume command to continue operation from the breakpoint.

29. A system to facilitate automated sequential processing in a network of interconnected controllers interacting with an industrial controller supporting execution of an industrial batch process, comprising the following components stored in computer memory and executable by a processor:
means for executing an equipment phase object within an industrial controller, the equipment phase object is accessible by at least one of internal instructions from within the industrial controller to control the equipment phase object and external instructions directed to the industrial controller from one or more of said network external controllers to at least one of access data, interact or control objects associated with the equipment phase object to affect operations within the industrial controller;
means for associating the equipment phase object with a plurality of state machines that operate at multiple levels of an industrial batch process, wherein the plurality of state machines are instantiated from within one or more of the network controllers external to the industrial controller, wherein the plurality of state machines are direct the external instructions to the industrial controller to at least one of access data, interact or control objects associated with the equipment phase object to affect operation of the industrial controller, the equipment phase object further operable for maintaining information related to at least one of configuration, state or execution associated with the industrial batch process pertinent to the industrial controller; and means for concurrently controlling the object from at least two state machines of the plurality of state machines, wherein the equipment phase object upon concurrently receiving at least two external instructions from one or more of said multiple levels of state machines, manages the at least two concurrently received external instructions according to prioritization rules, wherein the at least two concurrently received external instructions are directed as one or more concurrent external client requests to the prioritization service of the equipment phase object for synchronization in accordance to the rules.

30. A computer readable medium having a data structure stored thereon for controlling an industrial state process in a network of interconnected controllers interacting with an industrial controller supporting execution of an industrial batch process, comprising:

an equipment phase object that controls one or more devices associated with the industrial batch process, wherein the equipment phase object is accessible by at least one of internal instructions from within the industrial controller to control the equipment phase object and external instructions directed to the industrial controller from one or more of said network external controllers to access data, interact or control objects within the equipment phase object to affect operations within the industrial controller, wherein the equipment phase object manages concurrent access from a plurality of state machines networked to the industrial batch process, wherein the plurality of state machines are instantiated from within one or more of said controllers external to the industrial controller and direct the external instructions via the network to the industrial controller to control the equipment phase object to affect operation of the industrial controller, wherein each of the plurality of state machines executes a portion of the industrial batch process, the equipment phase object further operable for maintaining information related to at least one of configuration, state or execution associated with the industrial batch process pertinent to the industrial controller, wherein the equipment phase object upon concurrently receiving at least two instructions from one or more of said multiple levels of state machines, manages the at least two instructions according to prioritization rules, wherein one or more of the at least two instructions is an instruction originated from said external state machines and directed as one or more concurrent external client requests to the prioritization service of the equipment phase object for synchronization in accordance to the rules.

31. The computer readable medium of claim 30, wherein at least one of the instructions relates to an equipment phase command or a clear equipment phase command.

32. The computer readable medium of claim 31, wherein the equipment phase command commands an equipment phase to start, stop, abort, hold, restart, reset, pause, an auto pause or resume.

33. The computer readable medium of claim 30, wherein at least one of the instructions relates to an equipment phase external request for communicating with an external sequencer.

34. The computer readable medium of claim 33, wherein the equipment phase external request includes one or more data fields comprising at least one of a request control, a request, a data value, or a control structure.

35. The computer readable medium of claim 34, wherein the request relates to at least one of a download of input parameters, an upload or download of output parameters, send message to an operator, clear message to operator, acquire resources, release resources, send message to linked phase, send message to linked phase and wait, cancel messages to linked phase, receive message from linked phase, download batch data, download or upload material data, upload reports or attributes, download or upload binding priority, or generate an electronic signature.

36. A computer readable medium having a data structure stored thereon for controlling an industrial state process in a network of interconnected controllers interacting with an industrial controller supporting execution of an industrial batch process, comprising:

at least one structured tag for interacting with an internal or an external sequence of industrial batch process;

an equipment phase object that executes at least one state routine associated with the industrial batch process; and a phase data type associated with the equipment phase object that is accessible from a plurality of state machines networked to the industrial batch process, wherein the plurality of state machines are associated with the external sequence of the industrial batch process, wherein the equipment phase object is accessible by at least one of internal instructions from within the industrial controller to control the equipment phase object and external instructions directed to the industrial controller from one or more of said network external controllers to access data, interact or control objects within the equipment phase object to affect operations within the industrial controller, wherein the equipment phase object manages concurrent access from the plurality of state machines networked to the industrial batch process, wherein the plurality of state machines are instantiated from within one or more of said controllers external to the industrial controller and direct the external instructions via the network to the industrial controller to control the equipment phase object to affect operation of the industrial controller, wherein each of the plurality of state machines executes a portion of the industrial batch process, the equipment phase object further operable for maintaining information related to at least one of configuration, state or execution associated with the industrial batch process pertinent to the industrial controller, wherein the equipment phase object upon concurrently receiving at least two instructions from one or more of said multiple levels of state machines, manages the at least two instructions according to prioritization rules, wherein one or more of the at least two instructions is an instruction originated from said external state machines and directed as one or more concurrent external client requests to the prioritization service of the equipment phase object for synchronization in accordance to the rules.

37. The computer readable medium of claim 36, wherein the phase data includes one or more elements, the elements include at least one of a state element, a running element, a holding element, a restarting element, a stopping element, an aborting element, a resetting element, an idle element, a held element, a complete element, a stopped element, an aborted element, a sub state element, a pausing element, a paused element, an auto pause element, a step index element, a failure element, a unit id element, or an owner element.

38. The computer readable medium of claim 37, wherein the elements include at least one of a pending request element, a download input parameter element, an upload parameter element, a send message element, a clear message element, an acquire resource element, a release resource element, a message to phase element, a cancel message to phase element, a wait message from phase element, an aborting request element, a generate electronic signature element, a download data element, or a new input parameter element.

39. A graphical user interface embodied on a computer readable medium that when executed on one or more processors facilitates controlling an industrial batch process in a network of interconnected controllers interacting with an industrial controller supporting execution of the industrial batch process, the graphical user interface comprising:
- at least one display object for interacting with an internal or an external sequence of the industrial batch process wherein the at least one display object allows a user take ownership of a phase, to command the phase, and to monitor at least one of a current state, owner, or fault information for the phase; and
- an equipment phase object that controls at least a portion of the industrial batch process, wherein the equipment phase object is accessible by at least one of internal instructions from within the industrial controller to control the equipment phase object and external instructions directed to the industrial controller from one or more of said network external controllers to access data, interact or control objects within the equipment phase object to affect operations within the industrial controller, wherein the equipment phase object manages concurrent access from the plurality of state machines networked to the industrial batch process, wherein the plurality of state machines are instantiated from within one or more of said controllers external to the industrial controller and direct the external instructions via the network to the industrial controller to control the equipment phase object to affect operation of the industrial controller, wherein each of the plurality of state machines executes a portion of the industrial batch process, the equipment phase object further operable for maintaining information related to at least one of configuration, state or execution associated with the industrial batch process pertinent to the industrial controller, wherein the equipment phase object upon concurrently receiving at least two instructions from one or more of said multiple levels of state machines, manages the at least two instructions according to prioritization rules, wherein one or more of the at least two instructions is an instruction originated from said external state machines and directed as one or more concurrent external client requests to the prioritization service of the equipment phase object for synchronization in accordance to the rules.

40. The graphical user interface of claim 39, further comprising a configuration menu having at least one input for selecting a pre-state routine, a fault routine, a program phase inhibit, an initial state, a complete state immediately selection, an initial step index, an external sequencer loss of communication command, and an external request hold action.

41. The graphical user interface of claim 40, wherein the parameters menu further comprising a parameter name field, a usage field, a value field, a data type field, or a description field.

42. The graphical user interface of claim 39, further comprising a parameters menu for configuring the control parameters or a monitor menu for monitoring the internal or external sequence.

43. The graphical user interface of claim 39, further comprising a phase toolbar having at least one of a tool tip display or a tab for monitoring a phase.

44. The graphical user interface of claim 43, wherein the tab includes at least one of a start button, a hold button, a restart button, a stop button, an abort button, a reset button, an auto pause button, a pause button, or a resume button.

45. The graphical user interface of claim 39, further comprising a display component to command phase from a graphic of a state diagram.

46. The graphical user interface of claim 39, wherein the graphic shows the types of owners or the number of owners for a respective phase.

47. The graphical user interface of claim 39, further comprising a component to allow users navigate to a logic program from a graphic or to create new logic directly from the graphic.

48. The graphical user interface of claim 39, wherein the graphic is re-sizeable.

49. The graphical user interface of claim 39, wherein the graphic is used in conjunction with developing or debugging logic or for viewing across a control room.

50. The graphical user interface of claim 39, further comprising at least one of an equipment phase list, an equipment phase state graphic, an inhibited phase graphic or a selection for a currently monitored equipment phase.

* * * * *